(12) United States Patent  
Sawai

(10) Patent No.: US 8,289,869 B2  
(45) Date of Patent: Oct. 16, 2012

(54) WIRELESS COMMUNICATION SYSTEM, WIRELESS COMMUNICATION DEVICE AND WIRELESS COMMUNICATION METHOD, AND COMPUTER PROGRAM

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 181 days.

(21) Appl. No.: 12/559,985

(22) Filed: Sep. 15, 2009

(65) Prior Publication Data

US 2010/0091675 A1    Apr. 15, 2010

(30) Foreign Application Priority Data

Oct. 10, 2008 (JP) .................................. 2008-263961

(51) Int. Cl.
*G01R 31/08* (2006.01)
*H04B 1/44* (2006.01)

(52) U.S. Cl. ........................................ 370/252; 370/282

(58) Field of Classification Search .................. 370/252, 370/282
See application file for complete search history.

(56) References Cited

U.S. PATENT DOCUMENTS

| 6,839,573 B1* | 1/2005 | Youssefmir et al. ........ 455/562.1 |
| 7,433,432 B2* | 10/2008 | Hoo .............................. 375/347 |
| 2007/0005749 A1* | 1/2007 | Sampath ...................... 709/223 |
| 2007/0098102 A1* | 5/2007 | Hottinen ...................... 375/260 |

FOREIGN PATENT DOCUMENTS

JP    2007-110203    4/2007

OTHER PUBLICATIONS

U.S. Appl. No. 13/394,568, filed Mar. 7, 2012, Sawai.

* cited by examiner

*Primary Examiner* — Huy D Vu
*Assistant Examiner* — Angel Brockman
(74) *Attorney, Agent, or Firm* — Oblon, Spivak, McClelland, Maier & Neustadt, L.L.P.

(57) ABSTRACT

A wireless communication system which includes a transmitter and receiver each having two or more antennae, the system including: a channel condition determining unit which determines a condition of a channel between the transmitter and the receiver; and a system control unit which changes a transmitting system in the transmitter and a receiving system in the receiver in accordance with a determination result obtained by the channel condition determining unit.

26 Claims, 12 Drawing Sheets

FIG. 5
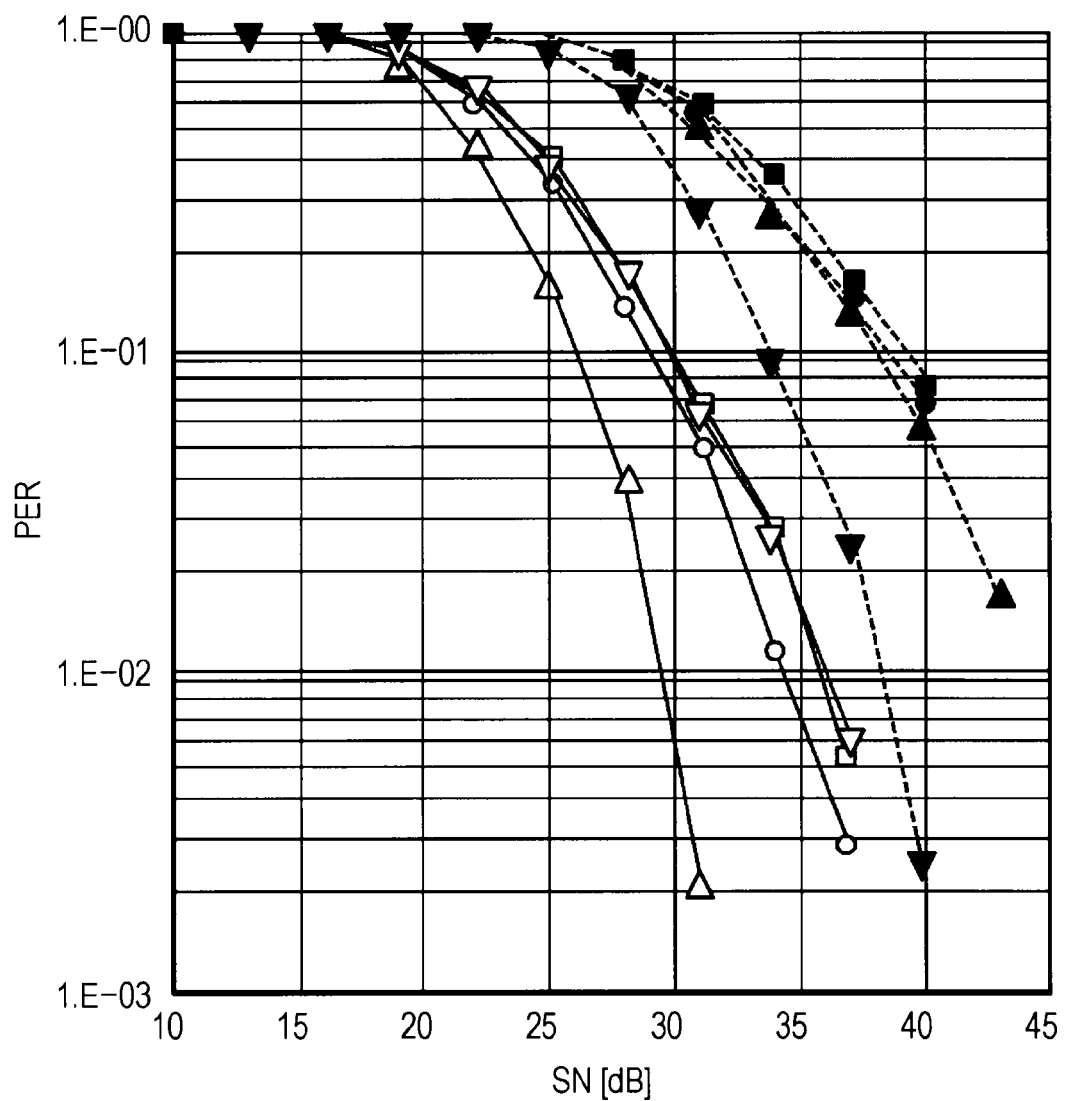
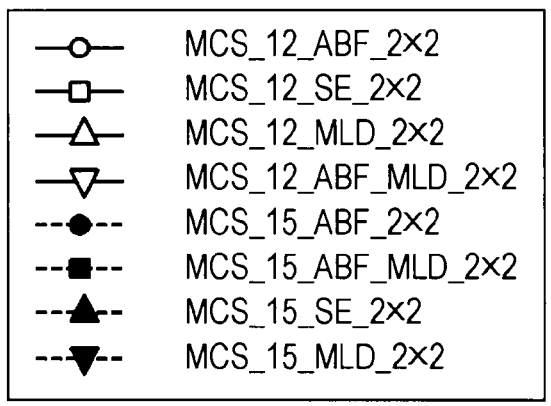

WIRELESS COMMUNICATION SYSTEM, WIRELESS COMMUNICATION DEVICE AND WIRELESS COMMUNICATION METHOD, AND COMPUTER PROGRAM

BACKGROUND OF THE INVENTION

1. Field of the Invention

The present invention relates to a wireless communication system, a wireless communication device, a wireless communication method and a computer program for data communication with transmission capacity increased by a space-multiplexing (MIMO) communication system between a pair of a transmitter and a receiver each having two or more antennae. More particularly, the invention relates to a wireless communication system, a wireless communication device, a wireless communication method and a computer program in which each of the transmitter and the receiver transmits and receives using a waveform equalization algorithm in one of a linear area and a non-linear area to attain the best link characteristic.

2. Description of the Related Art

Wireless networks are now attracting attention as novel communication systems to replace wired communication systems. Exemplary standards for wireless networks may include institute of Electrical and Electronics Engineers (IEEE) 802.11 and IEEE802.15. IEEE802.11a/g is a standard of wireless LANs employing orthogonal frequency division multiplexing (OFDM) modulation, which is a multi-carrier system.

Although the IEEE802.11a/g standard supports a modulating system which achieves a transmission speed of 54 Mbps at maximum, there is an increasing demand for a higher bit rate next-generation wireless LAN standard. A multi-input multi-output (MIMO) communication system is now attracting attention as a technique for providing high speed wireless communication. An OFDM_MIMO communication system is adopted in IEEE802.11n (TGn) which is an extended standard of IEEE802.11.

MIMO is a communication system which provides a space-multiplexed stream between a transmitter and a receiver each having plural antenna elements. The transmitter multiplexes plural transmission data by spatially and temporally encoding the data and transmits the data to channels via plural transmitting antennae. The receiver spatially and temporally decodes a signal received at plural receiving antennae via the channel to separate the signal into plural transmission data. In this manner, the original data can be obtained without causing crosstalk between the streams. The MIMO communication system can increase the transmission capacity in accordance with the number of antennae and improve the transmission speed without having to expand a frequency band. The MIMO communication system utilizes spatial multiplexing, which ensures greater frequency utilization efficiency. The MIMO communication system takes advantage of channel characteristics, and thus differs from a simple transmitting and receiving adaptive array.

In the MIMO communication system, a transmission weight matrix for spatially multiplexing transmission streams from plural transmitting branches and a receiving weight matrix for spatially separating the spatially-multiplexed signal are calculated by the receiver using the channel matrix H. The channel matrix H is a numerical matrix with element channel information corresponding to a pair of the transmitting and receiving antennae. The channel information herein refers to a transfer function which has phase and amplitude components. Usually, the channel matrix can be estimated by performing a frame exchange sequence including a training sequence having a known reference symbol for exciting the channel matrix between the transmitter and the receiver.

SVD-MIMO is known as one of systems which can provide the best link characteristic in the MIMO communication system. The system obtains a transmission beam-forming matrix V through singular value decomposition (SVD: Singular Value Decomposition) of the channel matrix H into UDVH (i.e., H=UDVH).

A relatively simple algorithm for obtaining a receiving weight matrix from the channel matrix H at the receiver which receives a beam-formed spatially-multiplexed signal is also proposed. Examples thereof include zero force (ZF) which simply uses an inverse matrix H-1 of the channel matrix H for the receiving weight matrix on the basis of the logic to remove crosstalk completely, and a minimum mean square error (MMSE) receiving system in which the receiving weight matrix W is calculated from the channel matrix H on the basis of a logic which maximizes a ratio of the electric power of the signal to a square error (i.e., the sum of crosstalk electric power and noise power). The ratio is also called SNR. MMSE is an algorithm which adopts a concept of noise power in the receiver and generates crosstalk intentionally to obtain the receiving weight matrix W. It is known that MMSE is advantageously used in an environment with a large amount of noise as compared to ZF.

Another algorithm for spatially separating the spatially-multiplexed signals is maximum likelihood detection (MLD) which estimates the maximum-likelihood transmission sequence by matching what with all the possible transmitted signal series patterns. Although MLD is known as a receiving system of excellent performance, it has a problem in that the operation scale is large and thus mounting is difficult.

A wireless communication system which improves the original receiving characteristic of SVD while reducing an operating load of SVD and MLD by combination of the SVD-MIMO communication system and the MLD reception system has been proposed (see for example, Japanese Unexamined Patent Application Publication No. 2007-110203).

Completely orthogonal channels are therefore formed between the transmission side and the reception side to provide the best link characteristic. The receiver can receive signals of any receiving system as long as the system is a linear area estimation system.

It has been found, however, by the inventors that in a case where the number of transmitting antennae of the transmitter is equal to the number of transmission streams formed by transmission beam-forming, when the same modulating systems are assigned to plural streams, the expected characteristic improvement effect of the MLD reception system which is the system for estimating the non-linear areas is hardly obtained and the characteristic becomes equivalent in either the MLD or the MMSE reception system with respect to the beam-forming transmission packet under some communication conditions (i.e., the condition of the channel matrix H).

SUMMARY OF THE INVENTION

It is therefore desirable to provide a wireless communication system, a wireless communication device, a wireless communication method and a computer program for data communication with transmission capacity increased by a space-multiplexing (MIMO) communication system between a pair of a transmitter and a receiver each having two or more antennae.

It is also desirable to provide a wireless communication system, a wireless communication device, a wireless communication method and a computer program in which each of the transmitter and the receiver transmits and receives using a waveform equalization algorithm at one of a linear area and a non-linear area to attain the best link characteristic.

It is also desirable to provide a wireless communication system, a wireless communication device, a wireless communication method and a computer program in which each of the transmitter and the receiver transmits and receives using a waveform equalization algorithm according to a condition of a channel matrix H to attain the best link characteristic.

A first embodiment of the invention is a wireless communication system which includes a transmitter and receiver each having two or more antennae, the system including: a channel condition determining unit which determines a condition of a channel between the transmitter and the receiver; and a system control unit which changes a transmitting system in the transmitter and a receiving system in the receiver in accordance with a determination result obtained by the channel condition determining unit.

The term "system" used herein refers to a logical collection of plural devices (or functional modules having a specific function) regardless of whether the devices or the functional modules are accommodated in a single housing.

A second embodiment of the invention is a wireless communication system according to the first embodiment, in which the channel condition determining unit calculates one of a determinant of a channel matrix and a rank of an eigenvalue estimated between the transmitter and the receiver to determine a number of streams that can be used for communication and a modulating system; the system control unit adopts a transmitting system based on a linear area equalization algorithm in the transmitter and a receiving system based on a linear area equalization algorithm when communication is established with the number of streams or modulating system within the determination result of the channel condition determining unit and cancels adaptation of the transmitting system based on a linear area equalization algorithm in the transmitter and adopts a receiving system based on a non-linear area equalization algorithm when communication is established with the number of streams or modulating system out of the determination result of the channel condition determining unit.

A third embodiment of the invention is a wireless communication system according to the second embodiment, in which the channel condition determining unit determines a rank number and SNR of the channel matrix between the transmitter and the receiver; the system control unit adopts a transmitting system based on a linear area equalization algorithm in the transmitter and a receiving system based on a linear area equalization algorithm in the receiver when the rank number of the channel matrix is high enough to allow two or more streams to pass through; and cancels adaptation of the transmitting system based on a linear area equalization algorithm in the transmitter and adopts a receiving system based on a non-linear area equalization algorithm when the rank number of the channel matrix is so lowered that two or more streams do not pass through but SNR of the two or more streams is high.

A fourth embodiment of the invention is a wireless communication system according to the second embodiment, in which, when M streams are to be transmitted with respect to M transmitting antennae, the system control unit cancels adaptation of the transmitting system based on a linear area equalization algorithm in the transmitter and adopts a receiving system based on a non-linear area equalization algorithm.

A fifth embodiment of the invention is a wireless communication system according to the second embodiment, in which, if a receiving system according to a non-linear area waveform equalization algorithm is adopted, the receiver returns a response packet with NonValid Sounding in response to a request to transmit a Sounding packet including a training sequence in order to excite the channel matrix from the transmitter.

A sixth embodiment of the invention is a wireless communication system according to the second embodiment, in which the receiver returns a response packet with NonValid Sounding when a link adaptation request is received from M-antenna transmitter in which the number of the streams is specified.

A seventh embodiment of the invention is a wireless communication system according to the second embodiment, in which the channel condition determining unit determines whether or not the transmitter should adopt a transmitting system based on a linear area equalization algorithm according to an eigenvalue of provided by a linear evaluation function according to an SNR of a channel between the transmitter and the receiver and an eigenvalue of the channel matrix, evaluation on the SNR alone, and an evaluation function for examining whether or not the condition of the channel is unsuitable for the non-linear area equalization algorithm.

An eighth embodiment of the invention is a wireless communication system according to the seventh embodiment, in which the condition unsuitable for the non-linear area equalization algorithm is to be determined that the channel matrix H is a unitary matrix obtains inappropriate power gain between the receiving antennae; and the system control unit applies a receiving system based on a linear area equalization algorithm in the receiver in accordance with the determination result.

A ninth embodiment of the invention is a wireless communication system according to the eighth embodiment, in which the channel condition determining unit estimates an eigenvalue on the basis of a channel matrix H of a beamformed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

A tenth embodiment of the invention is a wireless communication system according to the second embodiment, in which the channel condition determining unit has several constellation patterns for examination, calculates a metric distance in accordance with acquisition of the channel matrix H and, if the distance metric is smaller than a predetermined threshold, determines that the transmitter should not perform the beam-forming.

An eleventh embodiment of the invention is a wireless communication system according to the second embodiment, in which the channel condition determining unit has several constellation patterns for examination, calculates a metric of a receiving system based on a non-linear area equalization algorithm in accordance with acquisition of the channel matrix H and, if the distance metric is smaller than a predetermined threshold, determines that the transmitter should not perform the beam-forming.

A twelfth embodiment of the invention is a wireless communication system according to the second embodiment, in which, if it is determined that the receiver is currently receiving a beam-forming transmission signal, then the receiver adopts a receiving system based on a linear area equalization algorithm.

A thirteenth embodiment of the invention is a wireless communication system according to the twelfth embodiment, in which the receiver determines that the receiver is currently receiving a beam-forming transmission signal when the channel matrix H is a unitary matrix which obtains inappropriate power gain between the receiving antennae.

A fourteenth embodiment of the invention is a wireless communication system according to the twelfth embodiment, in which the receiver estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

A fifteenth embodiment of the invention is a wireless communication device including: two or more antennae; a channel condition determining unit which determines a condition of a channel with a communication partner; a communication unit which transmits and receives a packet; and a system control unit which switches transmitting and receiving systems in the communication unit in accordance with a determination result obtained by the channel condition determining unit.

A sixteenth embodiment of the invention is a wireless communication device according to the fifteenth embodiment, in which the channel condition determining unit calculates one of a determinant of a channel matrix and a rank of an eigenvalue estimated between the communication partner to determine a number of streams that can be used for communication and a modulating system; and the system control unit adopts a transmitting system or a receiving system based on a linear area equalization algorithm and a receiving system based on a linear area equalization algorithm when communication is established with the number of streams or modulating system within the determination result of the channel condition determining unit, and cancels adaptation of the transmitting system based on a linear area equalization algorithm and adopts a receiving system based on a non-linear area equalization algorithm when communication is established with the number of streams or modulating system out of the determination result of the channel condition determining unit.

A seventeenth embodiment of the invention is a wireless communication device according to the sixteenth embodiment, in which the channel condition determining unit determines a rank number and SNR of the channel matrix between the communication partner; and the system control unit adopts one of a transmitting system and a receiving system based on a linear area equalization algorithm and a receiving system based on a linear area equalization algorithm when the rank number of the channel matrix is high enough to allow two or more streams to pass through and cancels adaptation of the transmitting system based on a linear area equalization algorithm in and adopts a receiving system based on a non-linear area equalization algorithm when the rank number of the channel matrix is so lowered that two or more streams do not pass through but SNR of the two or more streams is high.

An eighteenth embodiment of the invention is a wireless communication device according to the sixteenth embodiment, further includes M transmitting antennae; wherein the system control unit cancels adaptation of the transmitting system based on a linear area equalization algorithm when M streams are to be transmitted.

A nineteenth embodiment of the invention is a wireless communication device according to the sixteenth embodiment, in which the system control unit adopts a receiving system based on a non-linear area equalization algorithm when a packet transmitted from M-antenna communication partner through M streams is to be received.

A 20th embodiment of the invention is a wireless communication device according to the sixteenth embodiment, in which the channel condition determining unit determines whether or not the communication partner should adopt a transmitting system based on a linear area equalization algorithm according to an eigenvalue of provided by a linear evaluation function according to an SNR of a channel between the communication partner and an eigenvalue of the channel matrix, evaluation on the SNR alone, and an evaluation function for examining whether or not the condition of the channel is unsuitable for the non-linear area equalization algorithm.

A 21st embodiment of the invention is a wireless communication device according to the 20th embodiment, in which the condition unsuitable for the non-linear area equalization algorithm is to be determined that the channel matrix H is a unitary matrix obtains inappropriate power gain between the receiving antennae; and the system control unit applies a receiving system based on a linear area equalization algorithm in accordance with the determination result.

A 22nd embodiment of the invention is a wireless communication device according to the 20th embodiment, in which the channel condition determining unit estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

A 23rd embodiment of the invention is a wireless communication device according to the sixteenth embodiment, in which the channel condition determining unit has several constellation patterns for examination, calculates a metric distance in accordance with acquisition of the channel matrix H and, if the distance metric is smaller than a predetermined threshold, determines that the communication partner should not perform the beam-forming.

A 24th embodiment of the invention is a wireless communication device according to the sixteenth embodiment, in which the channel condition determining unit has several constellation patterns for examination, calculates a metric of a receiving system based on a non-linear area equalization algorithm in accordance with acquisition of the channel matrix H and, if the distance metric is smaller than a predetermined threshold, determines that the communication partner should not perform the beam-forming.

A 25th embodiment of the invention is a wireless communication device according to the sixteenth embodiment, in which the system control unit applies a receiving system based on a linear area equalization algorithm if it is determined that the channel condition determining unit is receiving a beam-forming transmission signal.

A 26th embodiment of the invention is a wireless communication device according to the 25th embodiment, in which it can be determined that a beam-forming transmission signal is received when the channel matrix H is a unitary matrix which obtains inappropriate power gain between the receiving antennae.

A 27th embodiment of the invention is a wireless communication device according to the 26th embodiment, in which the channel condition determining unit estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

A 28th embodiment of the invention is a wireless communication method using two or more antennae, the method including the steps of: determining a condition of a channel with a communication partner; performing a communication by transmitting and receiving a packet; and performing a system control by switching transmitting and receiving systems the communication in accordance with a determination result obtained by a channel condition determining unit.

A 29th embodiment of the invention, a computer program described in a computer-readable format so that a wireless communication process using two or more antennae on a computer, the computer program allows the computer to function as: a channel condition determining unit which determines a condition of a channel with a communication partner; a communication unit which transmits and receives a packet; and a system control unit which switches transmitting and receiving systems in the communication unit in accordance with a determination result obtained by the channel condition determining unit.

The computer program according to the 29th embodiment of the invention defines a computer program described in a computer-readable format to perform a predetermined process on a computer. That is, the computer program according to the 29th embodiment of the invention may be installed in a computer to provide a cooperative effect on the computer. The computer program may therefore provide an operation effect similar to that of the wireless communication device according to the 15th embodiment of the invention.

The invention provides an improved wireless communication system, device, method and computer program in which each of the transmitter and the receiver transmits and receives using a waveform equalization algorithm at one of a linear area and a non-linear area to attain the best link characteristic can be provided.

The invention also provides an improved wireless communication system, device, method and computer program in which each of the transmitter and the receiver transmits and receives using a waveform equalization algorithm according to a condition of a channel matrix H to attain the best link characteristic.

In waveform equalization systems for linear areas, such as a SVD-MIMO and the MMSE, data on streams greater in number than a rank number of a channel matrix H are not received. Waveform equalization systems for non-linear areas, such as MLD, on the contrary, it is possible to receive data on streams greater in number than a number specified by a determinant of the channel matrix H or the rank of an eigenvalue regardless of a condition of the channel matrix H so long as a SNR of the streams are sufficiently high. According to the second to fourth, fifteenth to nineteenth, 28th and 29th embodiments of the invention, a transmitting and receiving system is controlled to obtain the maximum gain of the waveform equalization algorithm of each of the linear area and the non-linear area so that the best link characteristic is attained.

According to the fifth embodiment of the invention, in a receiving system according to a non-linear area waveform equalization algorithm, such as MLD, the receiver can control the transmitter not to perform beam-forming transmission by not returning a Sounding packet in response to a feedback request of a training signal from the transmitter. In this manner, establishment of a combination of an ABF according to a SVD-MIMO at the transmitter and the MLD at the receiver can be avoided whereby deterioration in the link characteristic can be prevented.

According to the sixth embodiment of the invention, in a receiving system according to a non-linear area waveform equalization algorithm, such as MLD, the receiver can control the transmitter not to perform beam-forming transmission by not returning a Sounding packet in response to a link adaptation request from the transmitter.

According to the seventh, eighth, 20th and 21st embodiments, when receiving a packet in beam-forming transmission, the receiver can switch itself to a receiving system according to a linear area equalization algorithm with a smaller circuit, such as a ZF and the MMSE, from the MLD reception system that has the best receiving property so as to reduce the power consumption.

According to the ninth and 22nd embodiments, it can be determined that the channel matrix H is a unitary matrix by estimating an eigenvalue on the basis of the total electric power of the channel from the transmitting antenna from the channel matrix H of a beam-formed packet, and determining whether an element for each antenna of the channel matrix H' which is the channel matrix H normalized with the estimated eigenvalue.

According to the tenth and 23rd embodiments, it can be examined whether the transmitter should perform the beam-forming transmission on the basis of the fact that the metrics with respect to plural transmission patterns come close to each other when it is not appropriate to perform the beam-forming transmission.

According to the eleventh and 24th embodiments, it can be examined whether the transmitter should perform the beam-forming transmission by determining whether the MLD is easy to be solved on the basis of mutual distance between the metrics obtained when the MLD is performed for each constellation pattern for examination.

According to the twelfth and 25th embodiments, when receiving beam-forming transmission signal based on the SVD, the receiver can switch itself to a receiving system according to a linear area equalization algorithm with a smaller circuit, such as a ZF and the MMSE, from the MLD reception system that has the best receiving property so as to reduce the power consumption.

According to the eleventh, fourteenth, 26th and 27th embodiments, it can be determined that a beam-forming transmission signal is received when the channel matrix H is a unitary matrix which obtains inappropriate power gain between the receiving antennae.

Other objects, feathers and advantages of the invention will become more apparent as the description proceeds in conjunction with the accompanying drawings.

BRIEF DESCRIPTION OF THE DRAWINGS

FIG. 5 illustrates a PER characteristic simulation result according to a SN environment regarding each transmitting and receiving system in a case where an antenna configuration between transmission and reception antennae is 2×24.

DESCRIPTION OF THE PREFERRED EMBODIMENTS

Hereinafter, embodiments of the invention will be described in detail with reference to the accompanying drawings.

Figure 10:
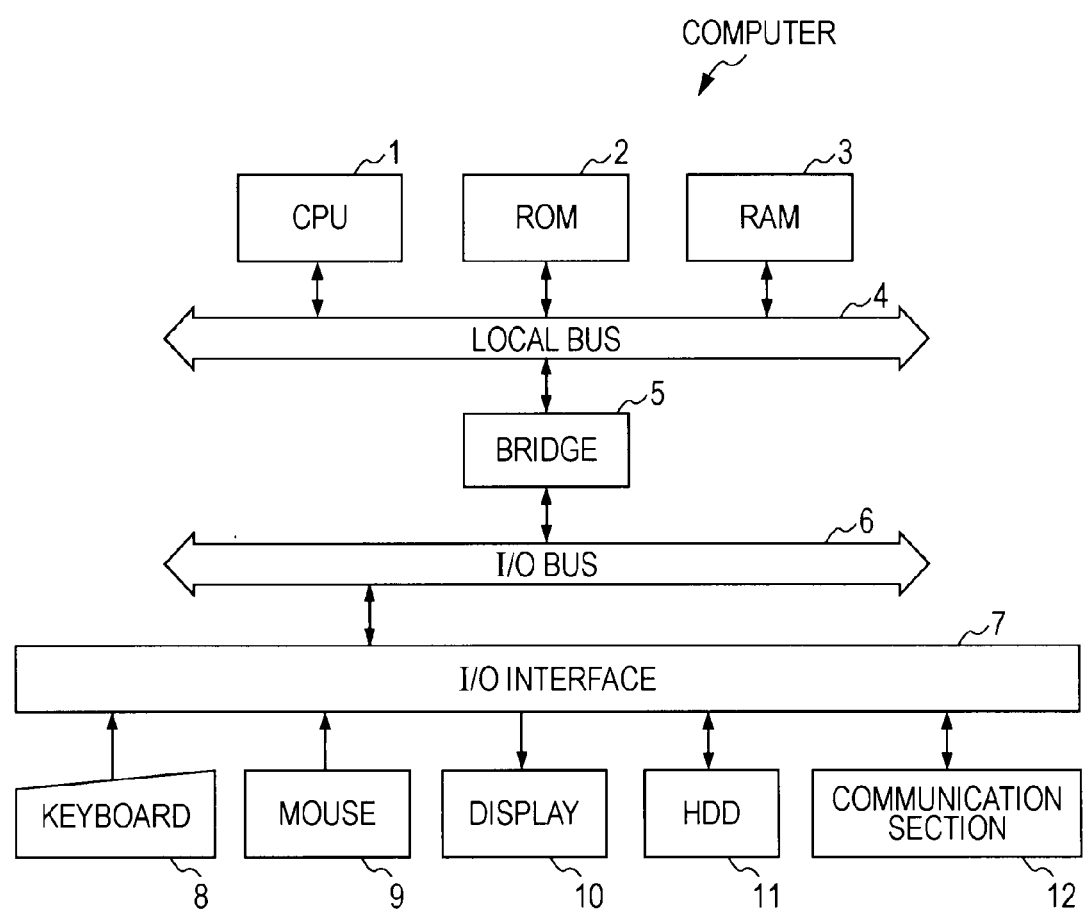
FIG. 10 illustrates an exemplary configuration of a computer incorporating a wireless communication system.

FIG. 10 illustrates an exemplary configuration of a computer which incorporates a wireless communication system.

A central processing unit (CPU) 1 executes programs stored in a read only memory (ROM) 2 or a hard disk drive (HDD) 11 under a program execution environment provided by an operating system (OS). For example, received packets which will be described later may be synchronized or partly synchronized by the CPU 1 executing a predetermined program.

The ROM 2 permanently stores program codes, such as power on self test (POST) and a basic input output system (BIOS). A random access memory (RAM) 3 is used to load programs stored in the ROM 2 or the HDD 11 to be executed by the CPU 1, or to temporarily hold operation data of the program which is being executed. These components are mutually connected by a local bus 4 coupled directly to a local pin of the CPU 1.

The local bus 4 is connected to an I/O bus 6, such as a peripheral component interconnect (PCI) bus, via a bridge 5.

A keyboard 8 and a pointing device 9, such as a mouse, are input devices operated by the user. A display 10 may be a liquid crystal display (LCD) or a cathode ray tube (CRT) for displaying various information as text or images.

A HDD 11 is a drive unit which incorporates and drives a hard disk as a storage medium. Programs to be executed by the CPU 1, such as an operating system and various applications, may be installed in the hard disk. Data files may be stored in the hard disk.

A communication section 12 is a wireless communication interface provided by, for example, IEEE802.11a/n. The communication section 12 operates as an access point or a terminal station under an infrastructure mode, or operates under an ad-hoc mode, to communicate with other communication terminals existing in a communication range.

In the present embodiment, the communication section 12 adopts a MIMO communication system which provides spatially multiplexed streams between the transmitter and the receiver each having plural antenna elements. A transmitting branch multiplexes plural transmission data by spatially and temporally encoding the data and transmits the data to channels via plural transmitting antennae. A receiving branch spatially and temporally decodes a signal received at plural receiving antennae via the channel to separate the signal into plural transmission data. In this manner, the original data can be obtained without causing crosstalk between the streams. The MIMO communication system can increase the transmission capacity in accordance with the number of antennae and improve the transmission speed without expanding a frequency band.

Figure 11:
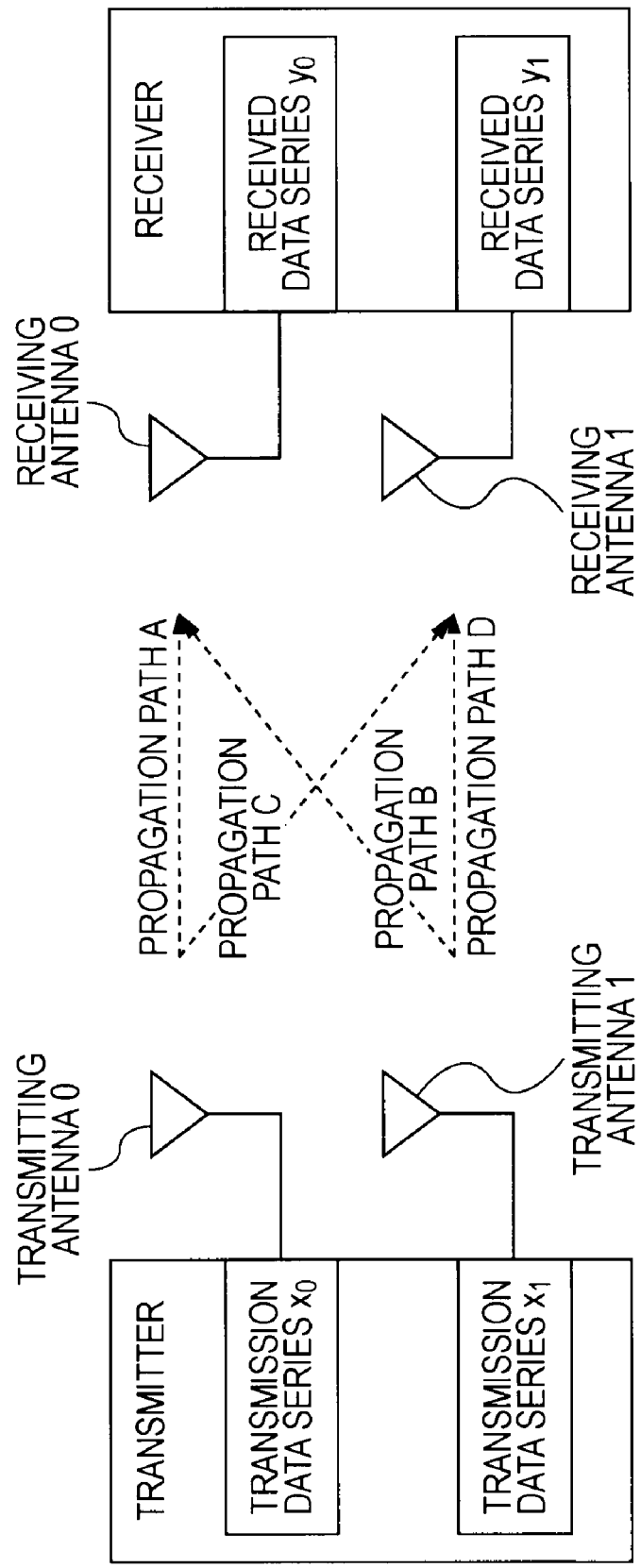
FIG. 11 schematically illustrates a MIMO communication system.

FIG. 11 schematically illustrates a MIMO communication system. The illustrated system has, for example, a two-streamed 2×2 configuration. A MIMO transmitter includes two antennae: a transmitting antenna 0 and a transmitting antenna 1. A MIMO receiver also includes two antennae: a receiving antenna 0 and a receiving antenna 1. A propagation path a is formed between the transmitting antenna 0 and receiving antenna 0, a propagation path b is formed between the transmitting antenna 1 and the receiving antenna 0, a propagation path c is formed between the transmitting antenna 0 and the receiving antenna 0 and a propagation path d is formed between the transmitting antenna 1 and the receiving antenna 1. The transmitter assigns a transmission data series $x_0$ to the transmitting antenna 0 and a transmission data series $x_1$ to the transmitting antenna 1. The receiver receives a received data series $y_0$ at the receiving antenna 1 and receives a received data series $y_1$ at the receiving antenna 1. A propagation path condition in this case can be represented by the following Equation (1) wherein y, H, x and n respectively represent a received signal, a channel matrix, a transmitted signal and a noise component.

$$y = H \cdot x + n \qquad (1)$$
$$y = \begin{bmatrix} y_0 \\ y_1 \end{bmatrix}, H = \begin{bmatrix} a & b \\ c & d \end{bmatrix}, x = \begin{bmatrix} x_0 \\ x_1 \end{bmatrix}$$

Although FIG. 11 illustrates an embodiment with two transmitting antennae and two receiving antennae, the MIMO communication system can be established similarly with two or more antennae. If the number of transmitting antennae is M and the number of receiving antennae is N, then the channel matrix has a configuration of N×M (columns×rows). Usually, the channel matrix H is established in the following manner: a known training sequence which excites the channel matrix is exchanged between the transmitter and the receiver; a transfer function is estimated on the basis of a difference between an actually received signal and a known sequence; and transfer paths of the pairs of transmitting and receiving antennae are arranged in a matrix form. A transmission weight matrix for spatially multiplexing transmission streams can be obtained from plural transmitting branches in the transmitter on the basis of the estimated channel matrix. A receiving weight matrix for spatially separating the spatially-multiplexed signal to plural original streams can be obtained at the receiver. Ideally, the number of transmission streams established is equal to the smaller one of the numbers of the transmitting and receiving antennae (MIN [M, N]).

As described above, a transmission beam-forming matrix V which gives weight to each transmitting antenna for beam-forming can be obtained by, for example, using SVD (above-described singular value decomposition) or other matrix decomposition techniques with respect to the channel matrix H during transmission. Singular value decomposition of the channel matrix H is represented by Equation (2).

$$H = UDV^H$$

$$D = \text{diag}(\sqrt{\lambda_1}, \sqrt{\lambda_2}, \ldots, \sqrt{\lambda_m}, 0, \ldots 0) \quad (2)$$

As represented by Equation (2), when the channel matrix H is subjected to singular value decomposition, m eigenvalues $\lambda i$ are obtained (i is an integer from 0 to m). The number m corresponds to the total number of linearly independent column vectors, i.e., ranks of the channel matrix H, which are included in the channel matrix. U represents a left singular matrix of arranged eigenvalues $\lambda i$ with normalized HHH, V (used as a transmission beam-forming matrix) represents a right singular matrix of arranged eigenvalues $\lambda i$ with normalized HHH and D represents HHH or a diagonal matrix having a square root of the eigenvalue $\lambda i$ of HHH as a diagonal element. U and V are unitary matrices which have mutually inverse complex conjugate transposed matrices. Gains of the eigenvalues are ordered so that a first eigenvalue $\lambda 1$ has the maximum gain and an M-th eigenvalue $\lambda m$ has the minimum gain. When the rank m of the channel matrix H decreases, the number of the transmission streams also decreases, which significantly affects the transmission efficiency.

An algorithm for obtaining a receiving weight matrix used to spatially separate a received signal from the channel matrix H may include a minimum mean square error (MMSE) receiving system. In the MMSE receiving system, the receiving weight matrix W is calculated from the channel matrix H on the basis of a logic which maximizes a ratio of the electric power of the signal to a square error (i.e., the sum of crosstalk electric power and noise power). The ratio is also called SNR. MMSE is an algorithm which adopts a concept of noise power in the receiver and generates crosstalk intentionally to obtain the receiving weight matrix W. It is known that MMSE is advantageously used in an environment with a large amount of noise.

Another algorithm for spatially separating the spatially-multiplexed signals is maximum likelihood detection (MLD) which estimates the maximum-likelihood transmission sequence by matching what with all the possible transmitted signal series patterns. Although MLD is known as a receiving system of excellent performance, it has a problem in that the operation scale is large and thus mounting is difficult.

These SVD and MMSE are classified into the waveform equalization algorithm for linear areas and MLD is classified into the waveform equalization algorithm for non-linear areas.

Figure 1:
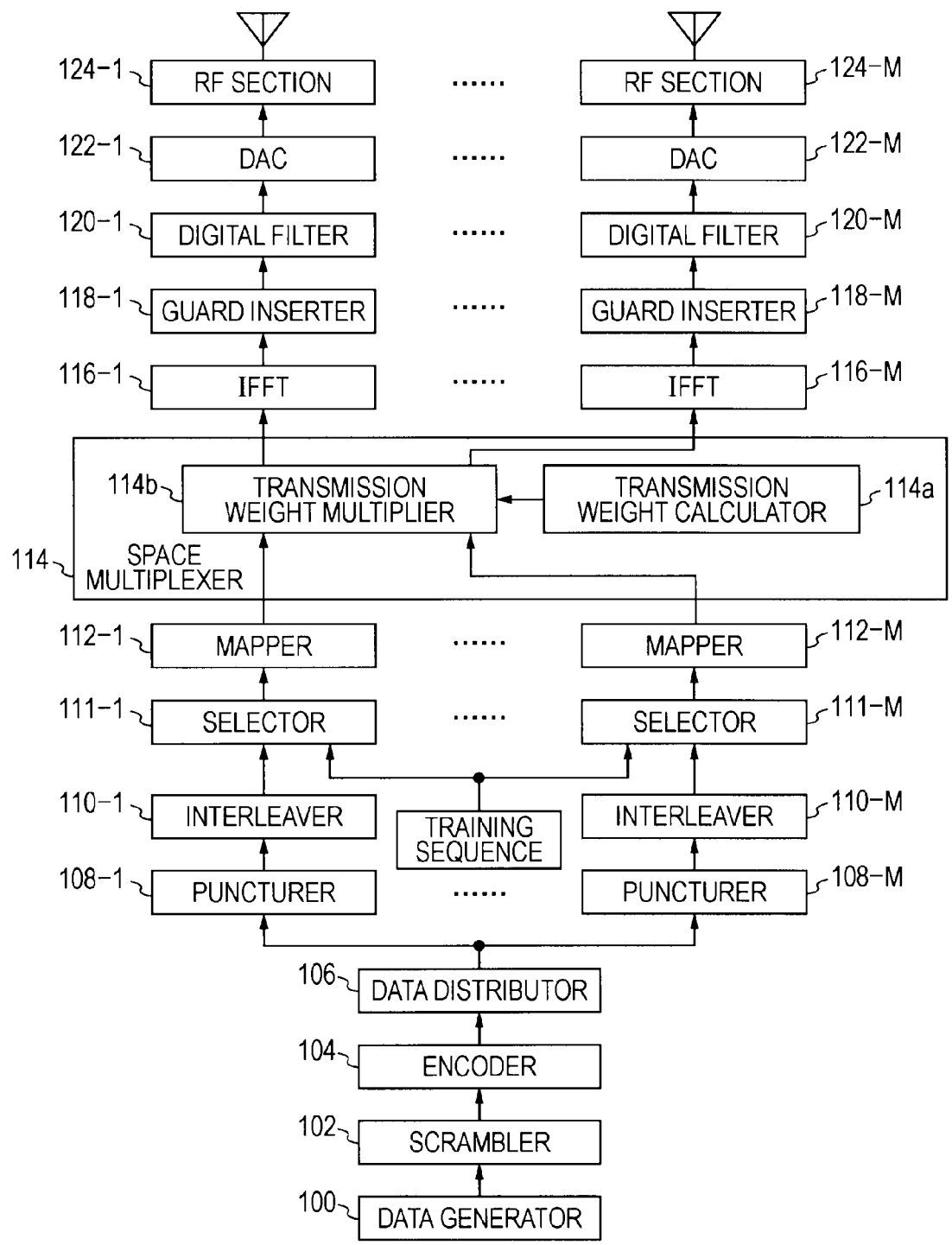
FIG. 1 illustrates an exemplary configuration of a MIMO transmitter.
Figure 2:
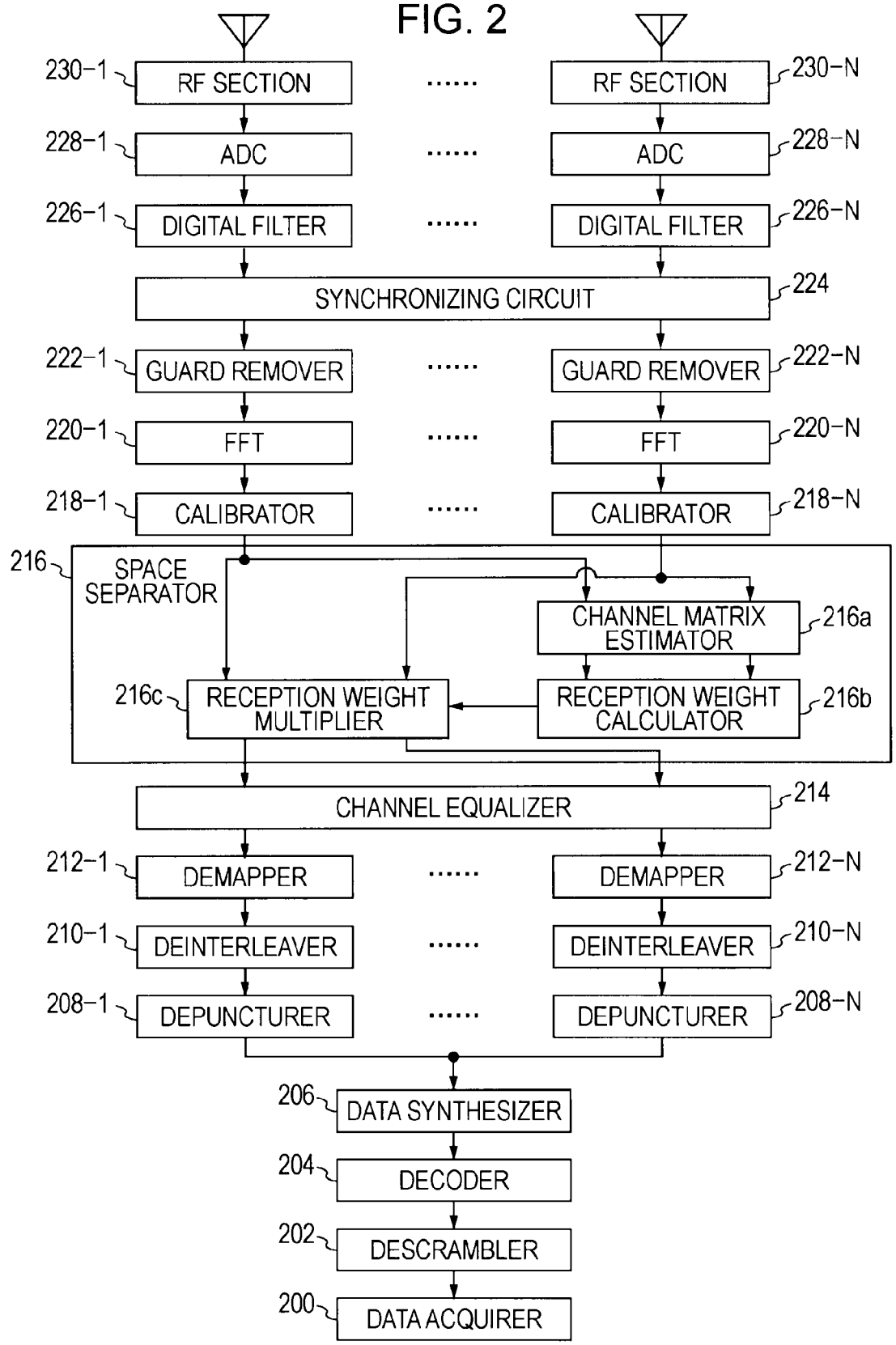
FIG. 2 illustrates an exemplary configuration of a MIMO receiver.

Exemplary configurations of the transmitter and the receiver of the communication section 12 for MIMO communication are illustrated in FIGS. 1 and 2.

The transmitter illustrated in FIG. 1 has M antennae (or m transmitting branches). In the systems conforming to IEEE, M is 4 at the maximum. The configuration of the transmitter will be described in which transmission beam-forming is performed.

Transmission data from a data generator 100 is scrambled by a scrambler 102. Then, the transmission data is sent to an encoder 104 which corrects errors and decodes the data. Scrambling and encoding systems follow the definition of, for example, IEEE802.11a. The encoded signal is then input into a data distributor 106 and distributed to the transmission streams.

In each transmission stream, in accordance with a data rate given for each stream, the transmitted signal is punctured by a puncturer 108, interleaved by an interleaver 110 and mapped by a mapper 112 into an IQ signal space which is formed by an in phase (I) and a quadrature phase (Q) to obtain a complex baseband signal. A selector 111 inserts a training sequence in the interleaved transmitted signal for each space stream at a suitable timing and sends the signal to the mapper 112. The interleaving system extends, for example, the definition of IEEE802.11a so that plural streams are not interleaved by the same interleaving system. The mapping system also conforms to IEEE802.11a and employs BPSK, QPSK, 16QAM and 64QAM.

In a space-multiplexing section 114, a transmission weight matrix calculator 114a for beam-forming establishes the transmission beam-forming matrix V by, for example, a matrix decomposition method, such as SVD, from the channel matrix H. The transmission beam-forming matrix V may also be established from channel information fed back from a communication partner, which is a known method. A transmission weight matrix multiplication section 114b subsequently multiplies the transmitting vector formed by the transmission streams by the transmission weight matrix V. In this manner, the transmitted signal is subject to beam-forming.

Fixed beam-forming may alternatively be employed other than an adaptive transmission beam-forming on the basis of the channel matrix H by the transmission weight matrix multiplication section 114b. In the following description, the adaptive beam-forming is called advanced beam-forming (ABF) and the fixed beam-forming is called spatial expansion (SE). Examples of the fixed beam-forming include cyclic delay diversity (CDD) which provides time difference in the transmit timing between the transmitting branches. CDD prevents formation of unintended beams when identical or similar signals are transmitted on different space streams. Both ABF and SE are transmitting systems according to the waveform equalization algorithm for linear areas. In the present embodiment, the transmission weight matrix multiplication section 114b may cancel the adaptation of the transmitting system according to a systematized algorithm in the linear areas on the basis of the examination results of the channel matrices, which will be described in detail later.

In the present embodiment, the transmission weight matrix multiplication section 114b may perform beam-forming by either of ABF or SE, or the transmission weight matrix multiplication section 114b may perform no weighting, which will be described in detail later.

An inverse fast Fourier transformer (IFFT) 116 converts each subcareer arranged in a frequency domain into time-base signals. A guard inserter 118 provides a guard interval to the signals. A digital filter 120 provides band regulation with respect to the signals. A D/A converter (DAC) 122 convert the signals into analog signals. A RF section 124 removes, using analog LPF, signal components which are out of desired bandwidths upconverts a center frequency to a desired RF frequency band and amplifies signal amplitude by power amplification. The transmitted signal within the RF band is emitted to space from each transmitting antenna.

The receiver illustrated in FIG. 2 has N antennae (or n transmitting branches). In the systems conforming to IEEE, N is 4 at the maximum. The receiver described below receives transmitting packet subject to beam-forming by ABF or SE or unweighed transmitting packet.

The data reached each receiving antenna branch through channels is subject to an analog process by a RF section 230 in each receiving antenna branch. The analog received signal is converted into a digital signal by an AD converter (ADC) 228 and input into a digital filter 226. The signal is then subject to packet detection, timing detection, frequency offset correction, noise estimation and other processes in a synchronizing circuit 224.

Figure 3:
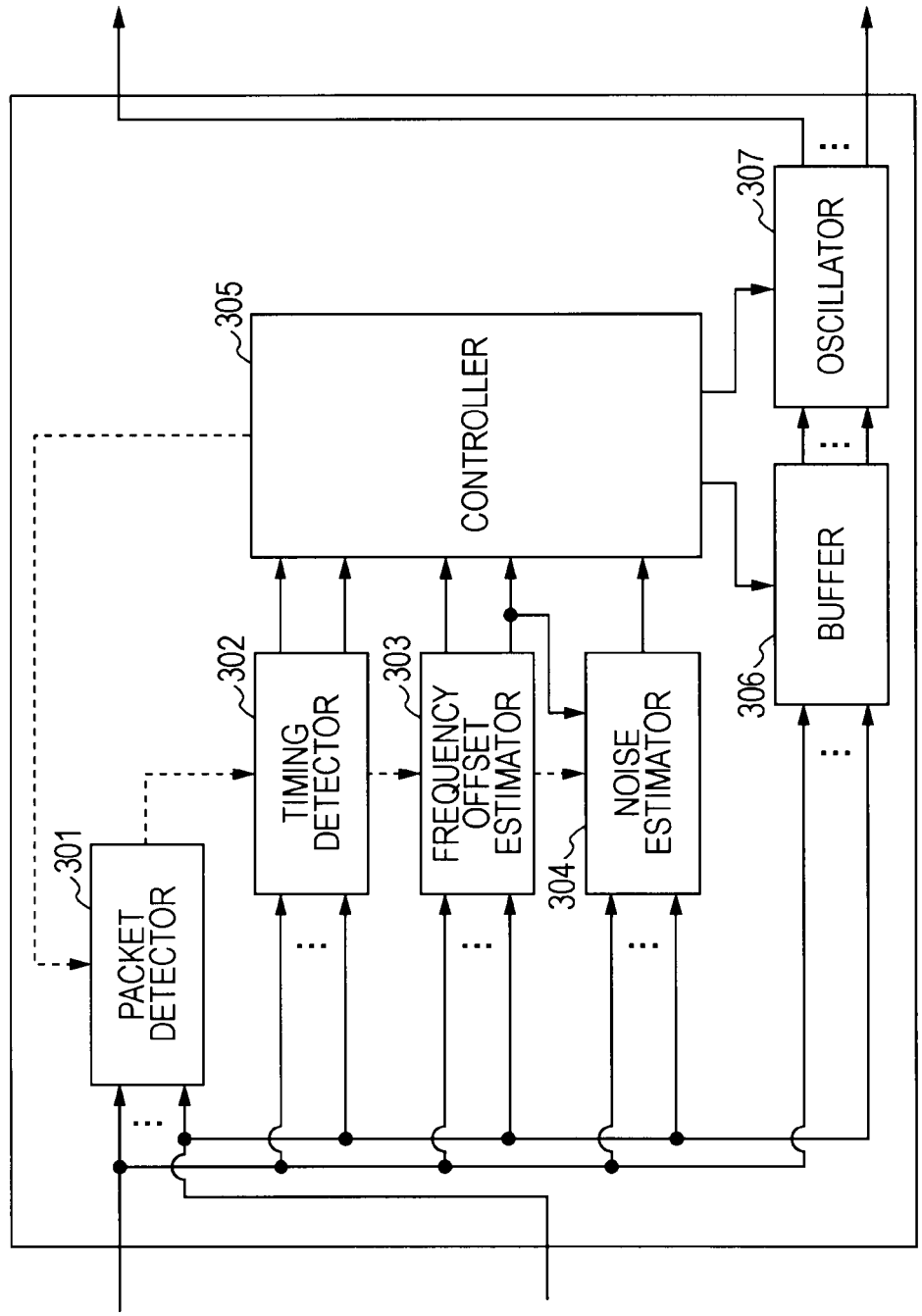
FIG. 3 illustrates an exemplary internal configuration of a synchronizing circuit 224.

FIG. 3 illustrates an exemplary internal configuration of a synchronizing circuit 224. While the received signal at each branch is accumulated in a buffer 306, a packet detector 301 detects a preamble signal at a packet head. After the packet detector 301 detects the packet, a timing detector 302, a frequency offset estimator 303 and a noise estimator 304 respectively estimate synchronization timing, frequency offset and noise using a subsequent section of the preamble signal. The controller 305 reads a received data sample from the buffer 306 on the basis of the detection timing by the timing detector 303. The controller 305 then outputs the sample while correcting an oscillator 307 on the basis of the frequency offset estimation value by the frequency offset estimator 303.

Figure 4:
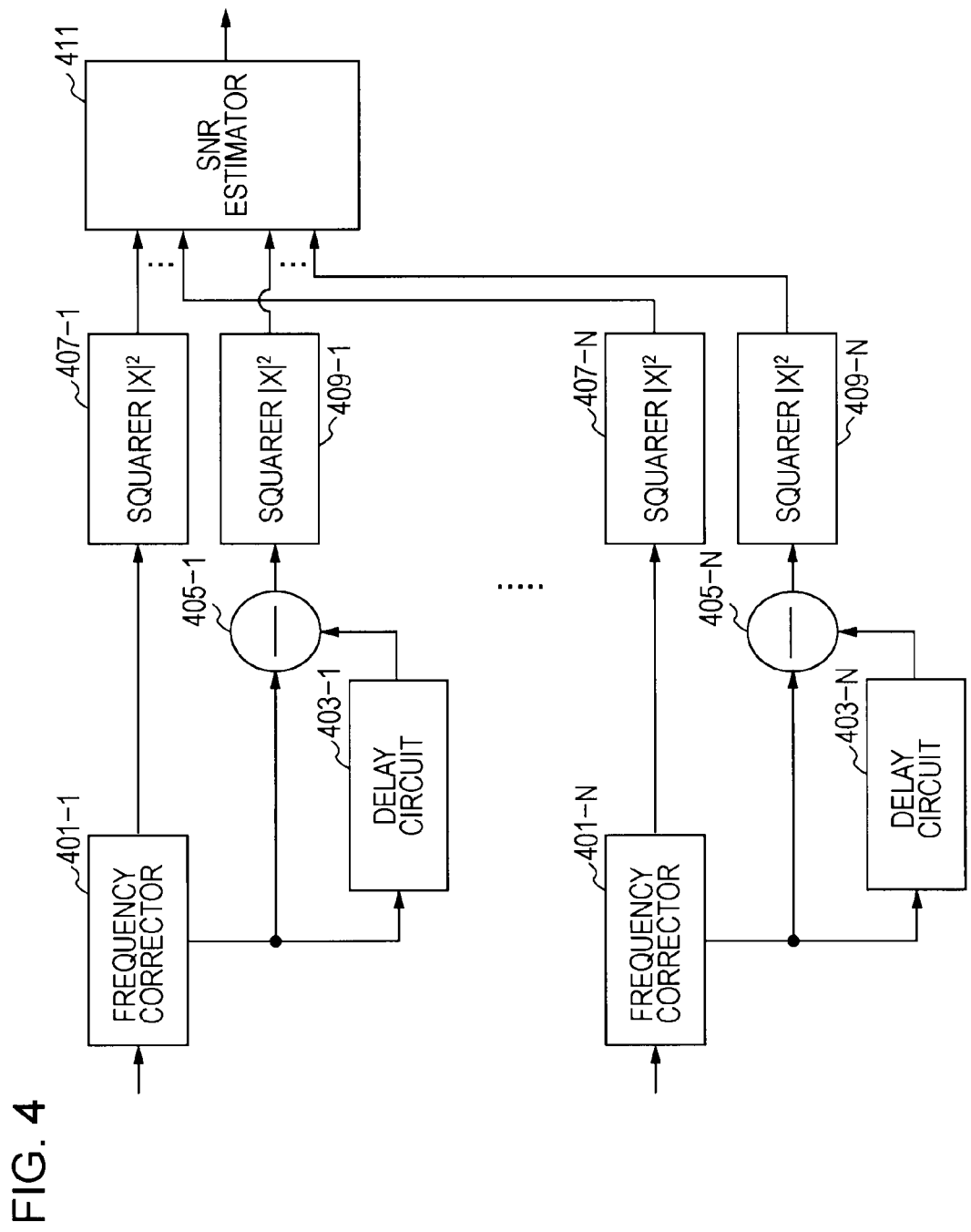
FIG. 4 illustrates an exemplary internal configuration of a noise estimating section 304.

An exemplary internal configuration of the noise estimating section 304 is shown in FIG. 4. Frequency offset of the received signal at each of the receiving branches is corrected by a frequency corrector 401. A delay circuit 403 generates a delay signal for a repeating cycle at a portion (which will be described below) used for noise estimation among training sequences formed by known patterns. A differential device 405 takes difference between the repeating cycles and extracts a noise component. A squarer 409 calculates a square value of the difference. The other squarer calculates square values of the signals. A SN estimator 411 estimates a SNR on the basis of the ratio of these square values.

Referring again to FIG. 2 and the configuration of the MIMO receiver will be described continuously. A guard removal section 222 removes guard intervals added to the head of the data transmitting section. A fast Fourier transform section (FFT) 220 converts time-base signals into frequency-base signals. In a subsequent calibration processing section 218, the received signal of each of the receiving branches are multiplied by a calibration coefficient for correcting imbalance in phase or amplitude among the transmission and reception branches. Imbalance in the phase and amplitude which exists among the receiving branches is collected in a digital section.

A space separator 216 spatially separates the spatially multiplexed received signal. In particular, a channel matrix estimator 216a establishes an estimated channel matrix H from a training sequence for exciting the channel matrix received at each of the receiving branches. The channel matrix may be sent to the transmission weight matrix calculator 114a for beam-forming of the transmitter as an opposite-direction channel matrix. An antenna receiving weight matrix calculator 216b calculates an antenna receiving weight matrix W on the basis of the channel matrix H obtained at the channel matrix estimator 216a. The antenna receiving weight matrix multiplication section 216b performs matrix multiplication of a receiving vector including receiving streams and an antenna receiving weight matrix W so as to spatially decode the space plural signal. In this manner, a signal series independent for each stream is obtained.

In the present embodiment, the condition of the channel matrix H estimated in the channel matrix estimator 216a and the estimated SNR are tested. An antenna receiving weight matrix calculator 216b switches between the MMSE receiving system which is the linear area waveform equalization algorithm or the MLD reception system which is the non-linear area waveform equalization algorithm on the basis of the examination result of the condition of the channel matrix H, which will be described in detail later.

A channel equalization circuit 214 performs residual frequency offset correction and channel tracking for each stream of the space-separated received signal. A demapper 212 demaps the received signal in the IQ signal space. A deinterleaver 210 deinterleaves. A depuncturer 208 depunctures at a predetermined data rate.

A data synthesizer 206 synthesizes plural reception streams to a single stream. The data synthesis is a completely reverse process of data distribution at the transmitter side. A decoder 204 corrects errors and decodes. A descrambler 202 then descrambles. A data acquisition section 200 acquires the reception data.

Next, a packet format used in the communication systems will be described. A PHY layer of IEEE802.11n has a high throughput (HT) transmission mode (hereinafter, referred to as a "HT mode") which has a Modulation and Coding Scheme (MCS), such as modulating system and encoding system, that is completely different from the related art IEEE802.11a/g. The PHY layer also has an operational mode (hereinafter, referred to as "legacy mode") for performing data communication in the same packet format and the same frequency domain as those of the related art IEEE802.11a/g. The HT mode includes an operational mode called "Mixed Mode (MM)" having compatibility with related art terminals (hereinafter, referred to as "legacy terminals") based on IEEE802.11a/g and an operational mode called "Green Field (GF)" having no compatibility with the legacy terminals.

Figure 12:
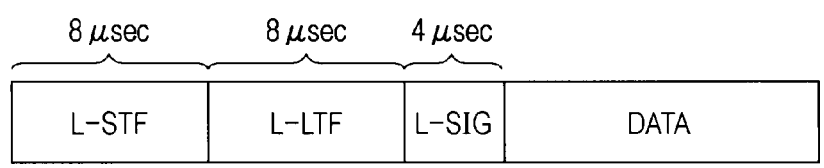
FIG. 12 illustrates a packet format in a legacy mode provided by IEEE802.11n.
Figure 13:
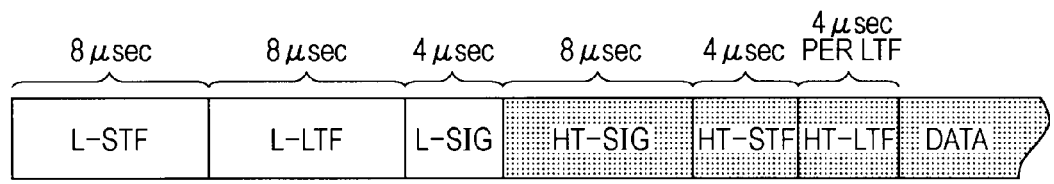
FIG. 13 illustrates a packet format in a MM mode provided by IEEE802.11n.
Figure 14:
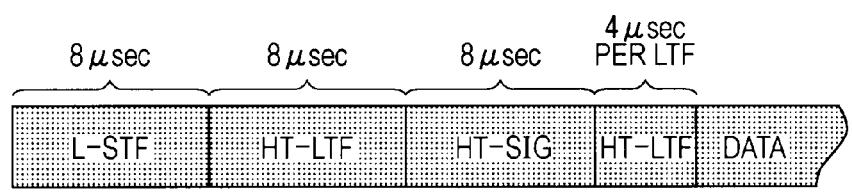
FIG. 14 illustrates a packet format in a GF mode provided by IEEE802.11n.

Packet formats in each operational mode, i.e., the legacy mode, MM and GF, are illustrated in FIGS. 12 to 14. In the drawings, one OFDM symbol corresponds to 4 microseconds.

The packet in the legacy mode (hereinafter referred to as "legacy packet") illustrated in FIG. 12 has the completely same format as that of IEEE802.11a/g. The header of the legacy packet includes a legacy short training field (L-STF), a legacy long training field (L-LTF) and a legacy signal field (L-SIG) as the legacy preamble followed by payload (Data). The L-STF includes known OFDM symbol for packet detection. The L-LTF includes known training symbols for synchronization acquisition and equalization. The L-SIG describes a transmission rate, a data length or other information.

A header of a packet illustrated in FIG. 13 (hereinafter referred to as "MM packet") includes a legacy preamble of the completely same format as that of IEEE802.11a/g, and a preamble (hereinafter, referred to as "HT preamble") having a format peculiar to subsequent IEEE802.11n (hereinafter, referred to as "HT format") and a data section. A part of the legacy packet corresponding to the PHY payload in the MM packet is in the HT format. That is, the HT format recursively includes the HT preamble and the PHY payload.

The HT preamble includes HT-SIG, HT-STF and HT-LTF. The HT-SIG has information necessary to interpret the HT format of MCS, data length of payload, etc. applied by PHY payload (PSDU). The HT-STF includes training symbols for improving automatic gain control (AGC) in the MIMO system. The HT-LTF includes training symbols for performing channel estimation for each input signal space-modulated (mapped) at the receiver end.

In the MIMO communication which uses two or more transmission branches, it is necessary at the receiver end to acquire a channel matrix by estimating the channel for each transmitting and reception antennas in which the received signals are space separated. Thus, at the transmitter end, the HT-LTF is transmitted in a time-sharing mode from each transmission antenna. Therefore, one or more HT-LTF fields will be added according to the number of space streams.

The legacy preamble in the MM packet is in a common format as that of the preamble of the legacy packet and is transmitted in a transmission method in which the legacy terminal may be decoded. The HT format portion after the HT preamble is transmitted by a transmission method to which the legacy terminal does not correspond. The legacy terminal decodes the L-SIG in the legacy preamble of the MM packet to read that the packet is not addressed to itself, and other information including data length. The legacy terminal can network allocation vector (NAV), i.e., a transmission standby period, of suitable length to avoid collisions. As a result, the MM packet has compatibility with the legacy terminal.

The packet (hereinafter, referred to as "GF packet") illustrated in FIG. 14 only includes a HT format portion. A preamble of the GF packet is formed of a L-STF field for packet detection, a HT-LTF field for channel estimation, a HT-SIG field in which information necessary for interpretation a HT format is described and a second HT-LTF field. In the MIMO communication, since it is necessary to perform channel estimation for each space stream to obtain the channel matrix, HT-LTFs of the number of the transmitting antennae are transmitted in the time-sharing mode (as described above) in the second HT-LTF field.

Figure 15:
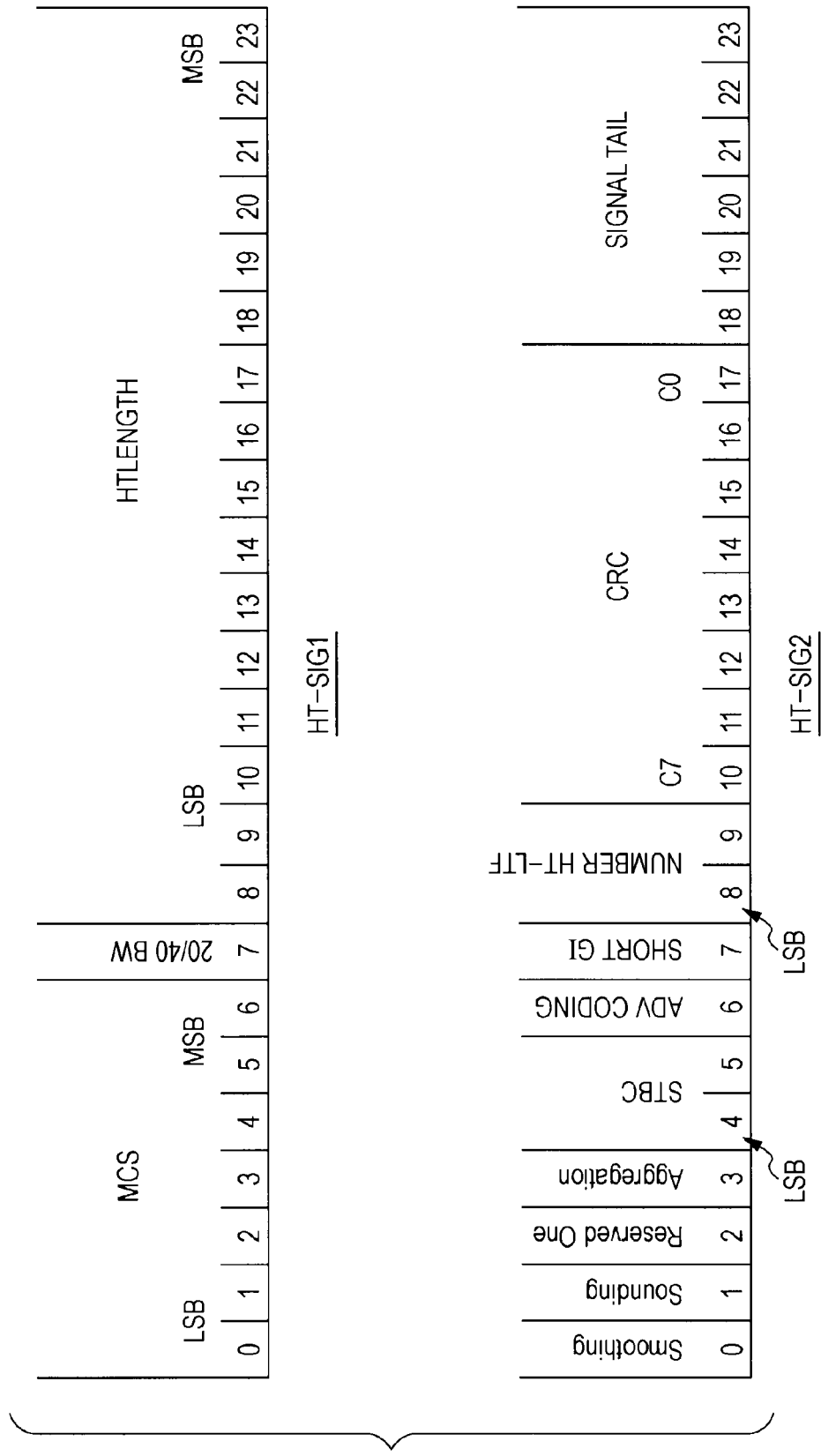
FIG. 15 illustrates a data structure of a HT-SIG field.

FIG. 15 illustrates a data structure of the HT-SIG field. As described in FIG. 15, the HT-SIG is formed by 2OFDM symbols, in which various control information necessary for interpretation the HT format, such as MCS (which will be described later) adopted in a PHY payload (PSDU) and data length of the payload. The description content in HT-SIG field is the same in both of the MM packet and the GF packet. In both the MM packet and the GF packet, it is determined that the preamble including the HT-SIG field adopts BPSK modulation with an encoding rate of ½ as in the legacy preamble and the HT preamble. Such a low data rate is used also to reliably provide processes and information notifying necessary for packet reception.

Next, the adaptive control of the transmitting and receiving system according to the condition of the channel matrix will be described.

In the MIMO communication system, the SVD-MIMO system performs transmission beam-forming using a right singular matrix V previously obtained by singular value decomposition of the channel matrix H. Completely orthogonal channels are therefore formed between the transmission side and the reception side to provide the best link characteristic. The receiver which receives the spatially-multiplexed signals subjected to transmission beam-forming can receive signals of any receiving system so long as it is a linear area estimation system.

It is found, however, by the inventors that in a case where the number of the transmitting antennae of the transmitter equal to the number of transmission streams formed by transmission beam-forming, when the same modulating systems are assigned to plural streams, the due characteristic improvement effect of the MLD reception system which is the estimated system of the non-linear areas is hardly obtained the characteristic becomes equivalent in either the MLD or the MMSE reception with respect to the beam-forming transmission packet under some communication conditions (i.e., the condition of the channel matrix H).

Here, the transmitter can perform the beam-forming transmission by ABF or SE. The transmitter can also transmit without beam-formation. The receiver can received in MMSE or MLD system.

Figure 6:
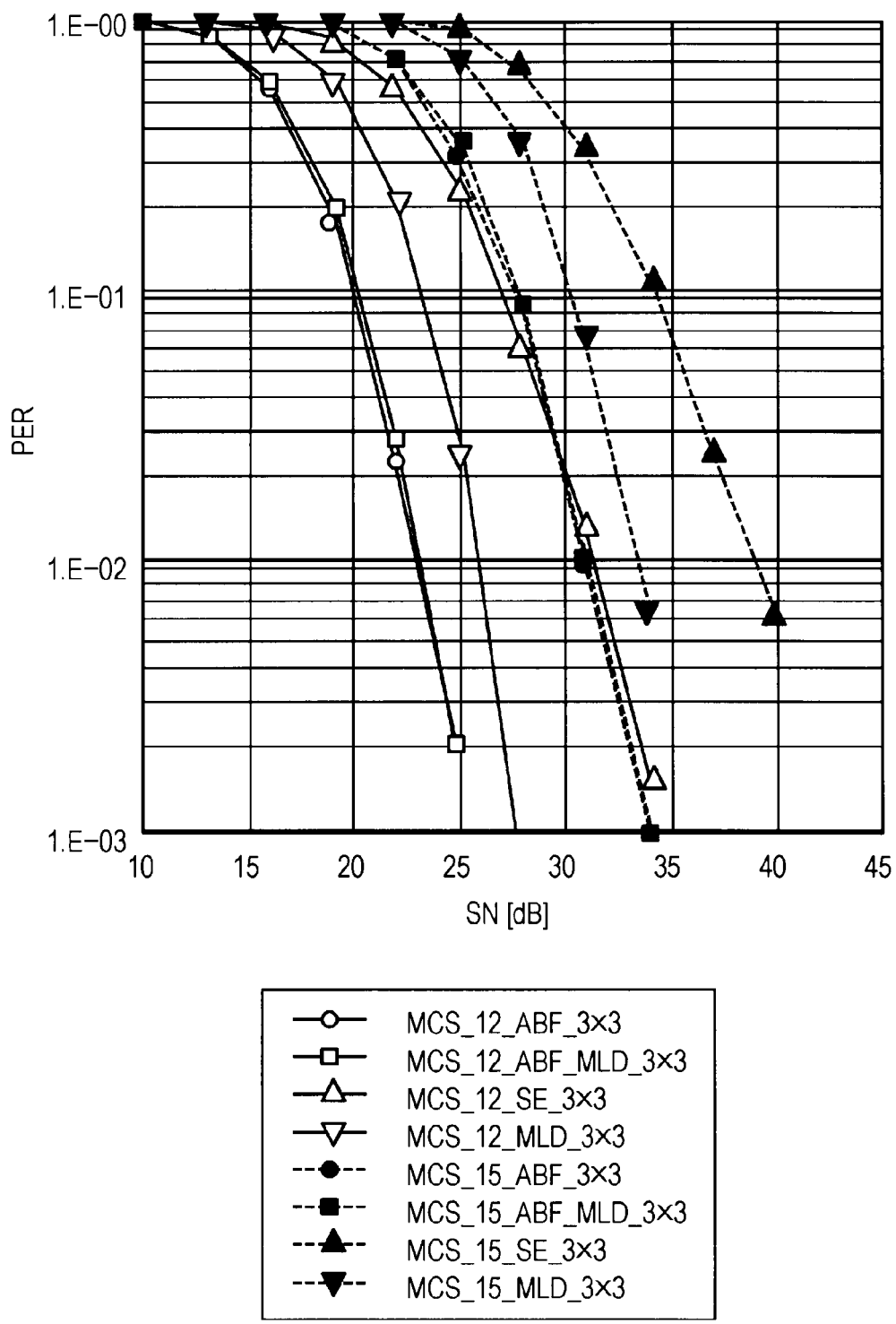
FIG. 6 illustrates a PER characteristic simulation result according to a SN environment regarding each transmitting and receiving system in a case where an antenna configuration between transmission and reception antennae is 3×3.
Figure 7:
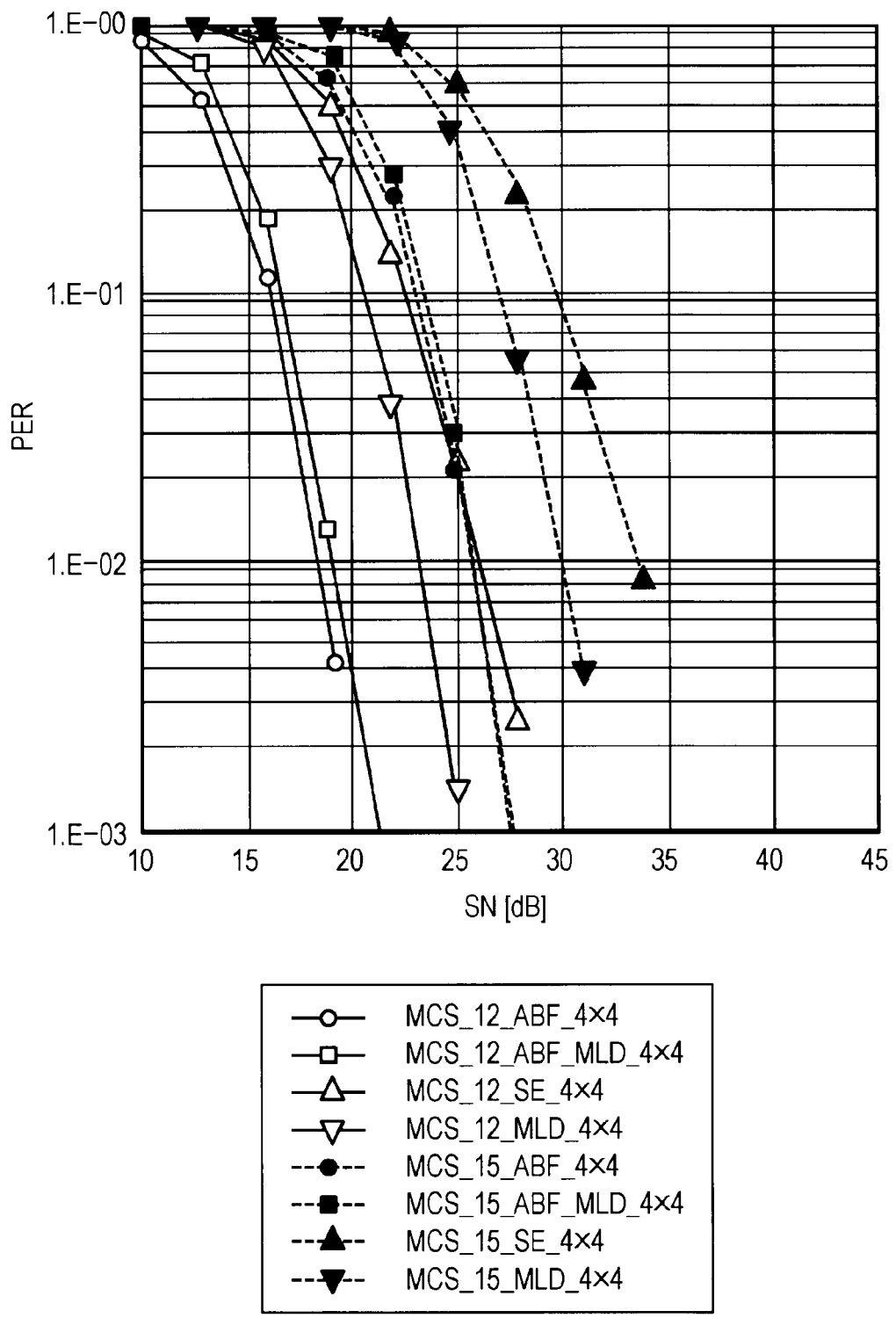
FIG. 7 illustrates a PER characteristic simulation result according to a SN environment regarding each transmitting and receiving system in a case where an antenna configuration between transmission and reception antennae is 4×4.

FIGS. 5 to 7 illustrate simulation results of a packet error rate (PER) according to the SN environment for each transmitting and receiving system in the antenna configuration between the transmitter and the receiver is 2×2, 3×3 and 4×4. Simulation models for the drawings are as follows.

TGn Ch.B
2000 speed
wo/all RF impair
MCS12/15 (2 stream only)

$$\text{ABF+MMSE, SE+MMSE, SE+MLD, ABF+MLD-} \quad 1000[\text{byte}] \tag{3}$$

A modulation and coding scheme (MCS) is a value for determination of the modulating system, encoding system and the number of the space channels. The contents of the MCSs 12 and 15 are as follows.

TABLE 1

| MCS Index | Modulation | R | $N_{BPSC}$ | $N_{SD}$ | $N_{SP}$ | $N_{CBPS}$ | $N_{DBPS}$ | Data rate(Mbps) 800 ns GI | 400 ns GI |
|---|---|---|---|---|---|---|---|---|---|
| 12 | 16 QAM | ¾ | 4 | 52 | 4 | 416 | 312 | 78.0 | 86.667 |
| 15 | 64 QAM | ⅚ | 6 | 52 | 4 | 624 | 520 | 130.0 | 144.444 |

FIG. 5 shows that, in the antenna configuration of 2×2, MLD has a characteristic greater than that of the ABF and that a combination of ABF and MLD have lower characteristic than that of the MLD when only MLD is employed in any modulation system and encoding system (MCS).

FIG. 6 shows that, in the antenna configuration of 3×3, MLD has a characteristic greater than that of the ABF and that a combination of ABF and MLD does not improve the characteristic in any modulation system and encoding system (MCS).

FIG. 7 shows that, in the antenna configuration of 4×4, MLD has a characteristic greater than that of the ABF and that a combination of ABF and MLD have lower characteristic than that of the MLD when no MLD is employed in any modulation system and encoding system (MCS).

In the simulation result of the antenna configuration of 2×2 illustrated in FIGS. 5 to 7, it is shown that the MLD characteristic exceeds the gain of the beam-forming transmission. A combination of beam-forming transmission (ABF) and MLD does not improve, or even decreases, the characteristic.

In each antenna configuration, features of the MIMO channel model according to measurement are represented by Equations (4) to (6).

$$H = UDV^H, \quad D = \begin{bmatrix} \lambda_1 & 0 \\ 0 & \lambda_2 \end{bmatrix} \tag{4}$$

$$\lambda_1 \gg \lambda_2$$

$$H = UDV^H, D = \begin{bmatrix} \lambda_1 & 0 & 0 \\ 0 & \lambda_2 & 0 \\ 0 & 0 & \lambda_3 \end{bmatrix} \quad (5)$$

$$\lambda_1 \cong \lambda_2 \gg \lambda_3$$

$$H = UDV^H, D = \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \quad (6)$$

$$(\lambda_1 \cong \lambda_2) \gg (\lambda_3 \cong \lambda_4)$$

In the 2×2 channel model, the difference over 10 dB exists between λ1 and λ2. In the 3×3 channel model, the difference over 10 dB exists between λ1 and λ2, and λ3. In 4×4 channel model, the difference over 30 to 40 dB exists between λ1 and λ2, and λ3 and λ4.

An inappropriate modulating system for each stream is therefore actually adopted in accordance with the condition of the channel matrix H (i.e., quality of the communication stream represented by the eigenvalue λi which is a diagonal element of a diagonal matrix D). Accordingly, in the identically-rated packet error rate (PER) characteristic, characteristic of the ABF in the SVD-MIMO system is not inferior to the MLD characteristic.

In the two-stream configuration of IEEE802.11n, however, since no inequality modulation at a rate higher than that of the MCS12 (104 Mbps at 20 MHz) exists (the highest rate is 97.5 Mbps at 20 MHz), the MLD characteristic is greater than that of the SVD-MIMO at the peak rate in an environment in which data of a rate higher than that of the MCS 12 passes through. It is a bottleneck in mounting that it is difficult to adopt a modulating system of 64QAM or greater with respect to streams of higher gain.

The present inventors have derived the following conclusions from the results illustrated in FIGS. 5 to 7.

(1) If the number of the transmitting antennae (M) and the number smaller than that of the transmission streams (below MIN (M, N)) are equal, the characteristic of MLD reception should be considered with no margin. The characteristic is almost equal to that when the beam-forming transmission and the MMSE receiving are combined (i.e., ABF+MMSE).

(2) If the antenna configuration is with the number of the transmitting antenna being greater than the maximum number of the transmission streams, the original characteristic of the MLD reception can be maintained regardless of combination with any modulating systems. The characteristic of the combination of the beam-forming transmission and the MMSE receiving (ABF+MMSE) can always keep the margin with respect to the MLD reception characteristic and therefore ABF and MMSE can co-exist and improve each other.

Effects of the beam-forming (i.e., SVM-MIMO) transmission when the beam-forming transmission and the MLD reception are combined (ABF+MLD) is about 1 dB at most. In some cases, a combination of the beam-forming transmission and the MMSE reception has a greater characteristic than that of MLD (ABF+MMSE>>MLD).

Accordingly, in the MIMO communication system, the best link characteristic can be provided by switching the transmitting and receiving systems adaptively in accordance with the condition of the channel matrix H.

From the viewpoint of the linear area waveform equivalent algorithms, such as SVD and MMSE, the rank of the channel matrix (H=UDVH) is lowered and the channels are difficult to accommodate two or more streams. If it is determined that the SNR of the two or more streams is high, then the transmitter cancels the ABF (i.e., the beam-forming transmission using the coefficient matrix V obtained through singular value decomposition of the channel matrix H) and transmits in a SE (i.e., a fixed beam-forming, such as Cyclic Delay) system without weighing. The receiver employs the MLD reception system according to the non-linear area waveform equivalent algorithm. In this manner, the peak rate can be increased by applying transmitting and receiving systems in accordance with the condition of the channel matrix.

If the transmitter is transmitting M streams with respect to the M antennae, the transmitter may cancel the beam-forming transmission on the basis of the SVD decomposition and transmits in a SE (i.e., a fixed beam-forming, such as Cyclic Delay) system without weighing. At the receiver, increase in the peak rate is expected by application of the MLD reception system according to non-linear area waveform equivalent algorithm.

Here, in order to notify switching of the transmitting and receiving systems between the transmitter and the receiver, a method of using existing frame switching procedure may be employed.

Examples thereof include a frame switching procedure in which information regarding the channel matrix is fed back between the transmitter and the receiver. In the transmitter, the TRQ (Training Request) procedure of requesting, with respect to the receiver, transmission of the Sounding packet which includes a training sequence for exciting the channel matrix in order to establish the channel matrix. If the receiver is uses the MLD reception system according to the non-linear area waveform equalization algorithm, the receiver can intentionally prevent beam-forming transmission from the transmitter by transmitting the response packet with "NonValid" Sounding flag (see FIG. 15) which is the header unit in the HT-SIG. In this manner, establishment of a combination of an ABF according to a SVD-MIMO at the transmitter and the MLD at the receiver can be avoided whereby deterioration in the link characteristic can be prevented.

Figure 8:
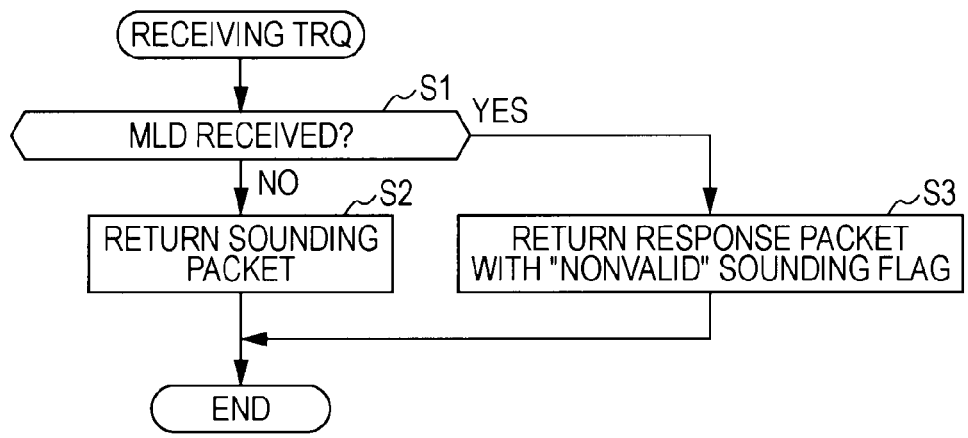
FIG. 8 is a flowchart of a procedure to switch transmitting and receiving systems using a TRQ frame switching procedure.

FIG. 8 illustrates a flowchart of a procedure for switching the transmitting and receiving systems using a TRQ frame switching procedure.

Upon receiving a TRQ packet from the transmitter, the receiver confirms whether itself is currently receiving in the MLD mode (step S1).

If the receiver is not receiving in the MLD mode (negative in step S1), the receiver returns a Sounding packet to the transmitter (step S2).

The transmitter can obtain the channel matrix H and can perform beam-forming transmission after the coefficient matrix V produced through singular value decomposition is used.

If the receiver is currently receiving in the MLD mode (negative in step S1), the receiver transmits a response packet with "NonValid" Sounding flag in the HT-SIG (step S3). In this case, since no Sounding packet is sent to the transmitter, the receiver can intentionally prevent the beam-forming transmission from the transmitter.

Another switching procedure is a frame switching procedure for performing a link adaptation between the transmitter and the receiver. The flame switching procedure includes following two methods.

One of the methods is to transmit a link adaptation feedback (MCS feedback: MFB) which includes a recommended transmission system MCS from a responder communication station to an initiator communication station within a single transmission opportunity (TXOP). The other of the methods is to return a link adaptation feedback (MFB) at a subsequent transmission opportunity (TXOP) upon receiving a packet which includes a request to send (i.e., a MCS Request: MRQ) of the transmission system MCS from a communication partner.

In either link adaptation method, the receiver transmits a response packet with "NonValid" Sounding flag in the HT-SIG upon receiving a MRQ in which the number of the streams M is specified as the recommended MCS from M-antenna transmitter. In this manner, beam-forming transmission in the transmitter can be intentionally prevented without returning a Sounding packet, thereby preventing deterioration in the link characteristic.

Figure 9:
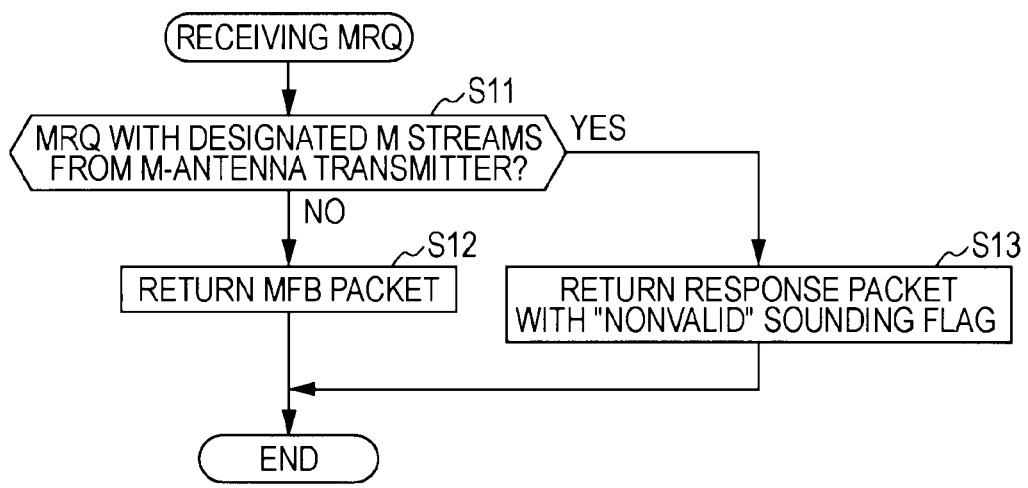
FIG. 9 is a flowchart of a procedure to switch transmitting and receiving systems using a MRQ frame switching procedure.

FIG. 9 illustrates a flowchart of a procedure for switching the transmitting and receiving systems using a MRQ frame switching procedure.

Upon receiving a MRQ packet from the transmitter, the receiver confirms the number of the antenna at the transmitter of the packet and the contents of the recommended MCS. The receiver then confirms whether the MRQ is with designated M streams from M-antenna transmitter (step S11).

Here, if the M-antenna transmitter does not request the link adaptation with designated M streams (i.e., the number of the streams smaller than the number of the transmitting antenna number is designated) (negative in step S11), then the receiver return the MFB to the transmitter (step S12). In this manner, link adaptation with designated M streams is established between the transmitter and the receiver.

If the M-antenna transmitter requests the link adaptation with designated M streams (affirmative in step S11), the receiver transmits a response packet with "NonValid" Sounding flag in the HT-SIG (step S13). In this case, the receiver can intentionally prevent beam-forming transmission in the transmitter.

It should be noted that the invention is not limited only to these two frame switching procedures used to notify the transmitting and receiving systems and therefore the procedure can be changed suitably in accordance with a communication protocol applied to the communication system.

Regardless of which frame switching procedure is employed to switch the transmitting and receiving systems of the MIMO communication system, it is important to determine how the condition of the channel matrix H is examined as a determination condition whether the beams-forming transmission is to be performed by the transmitter.

The SVD-MIMO system and MMSE receiving system are the waveform equalization technique for linear areas. Accordingly, the greatest selectable stream number and the modulating system can be determined in accordance with the determinant of the inverse matrix H-1 of the channel matrix H and the rank number of the eigenvalue $\lambda i$.

The MLD reception system is a waveform equalization technique for non-linear areas. A received signal y is y=Hx+n (n represents a noise signal) as represented by Equation (1) when a transmitted signal x is propagated on a channel which is formed by the channel matrix H. The MLD receiver generates a replica using plural transmitted signal candidates xk with respect to the received signal y and outputs a signal candidate which makes the Euclidean distance |y−H·xk|2 be the minimum. Accordingly, the metric calculation of the MLD reception system is represented by Equation (7).

$$\underset{0<k<m}{\text{metric}} = \|y - H \cdot x_k\| \tag{7}$$

Here, it is considered using actual example whether the characteristic of the MLD is improved or not. For example, suppose that two streams are transmitted in the BPSK modulation system under a condition of the channel matrix H represented by Equation (8). In terms of the inverse matrix H-1 of the channel matrix H, the determinant is 0.0266 and it is therefore a channel environment in which it is difficult to pass the two streams between the transmitter and the receiver.

$$H = \begin{bmatrix} -0.6918 & 1.254 \\ -0.858 & -1.5937 \end{bmatrix} \tag{8}$$

A combination between MLD, i.e., all the possible transmitted signal series patterns and the channel matrix H is represented by Equation (9). In Equation (9), since the distances among all the estimation vectors are large, the difference is large among all the estimation vectors, the maximum-likelihood transmitting vector can be easily found.

$$\begin{bmatrix} 1 \\ 1 \end{bmatrix} \Rightarrow \begin{bmatrix} -0.5622 \\ -0.7357 \end{bmatrix} \tag{9}$$

$$\begin{bmatrix} 1 \\ -1 \end{bmatrix} \Rightarrow \begin{bmatrix} -1.9458 \\ 2.4517 \end{bmatrix}$$

$$\begin{bmatrix} -1 \\ 1 \end{bmatrix} \Rightarrow \begin{bmatrix} 1.9458 \\ -2.4517 \end{bmatrix}$$

$$\begin{bmatrix} -1 \\ -1 \end{bmatrix} \Rightarrow \begin{bmatrix} -0.5622 \\ 0.7357 \end{bmatrix}$$

In waveform equalization systems for linear areas, such as a SVD-MIMO and the MMSE, data on streams greater in number than a rank number of a channel matrix H are not be received. It is shown in Equation (9) that waveform equalization systems for non-linear areas, such as MLD, on the contrary, it is possible to receive data on streams greater in number than a number specified by a determinant of the channel matrix H or the rank of an eigenvalue regardless of a condition of the channel matrix H so long as a SNR of the streams are sufficiently high.

When the channel matrices according to estimated SNR1 and SNR2 for each channel and the eigenvalues $\lambda 1$ and $\lambda 2$ are to be linked together, a linear evaluation function like y represented by Equation (10) can be used. As described above, the estimated SNR can be obtained by the noise estimator 304 in the synchronizing circuit 224.

$$\gamma = \begin{bmatrix} SNR_1 \times \lambda_1 & 0 \\ 0 & SNR_2 \times \lambda_2 \end{bmatrix} \tag{10}$$

$$\lambda_1 \gg \lambda_2$$

In the present embodiment, it is determined whether or not the transmitter should perform the transmission beam-forming by applying, in addition to the linear evaluation function obtained from y in Equation (10), an evaluation function for evaluating an estimation SNR alone and evaluating whether the data to be received is under a condition corresponding to a condition which MLD has difficulty in reception. The condition which MLD has difficulty in reception is, for example, a case in which it can be determined that a beam-forming transmission signal based on SVD is received when the channel matrix H (i.e., UDVH) is a unitary matrix (e.g., UD) which obtains inappropriate power gain between the receiving antennae. The condition is represented by Equation (11). That is, if the second eigenvalue 22 is extremely small, then that environment is not suitable for two streams.

$$H = UD, D = \begin{bmatrix} \lambda_1 & 0 \\ 0 & \lambda_2 \end{bmatrix} \quad (11)$$

$$\lambda_1 \gg \lambda_2$$

A means to determine whether the channel matrix H is a unitary matrix will be described later.

Several methods to examination the condition of the channel matrix for appropriately determining whether the transmission beam-forming is to be performed at the transmitter will be described below.

An exemplary calculation of the metric value when the two beam-forming transmissions are performed by applying a BPSK modulation system to the MIMO channel H illustrated in Equations (8) and (9) will be described. In terms of the singular value, the channel matrix H is represented by Equation (12).

$$D = \begin{bmatrix} 2.308 & 0 \\ 0 & 0.0113 \end{bmatrix} \quad (12)$$

$$HV = \begin{bmatrix} -1.4321 & 0.009 \\ 1.81 & 0.0071 \end{bmatrix}$$

An exemplary calculation of the metric value is represented by Equation (13).

$$\begin{bmatrix} 1 \\ 1 \end{bmatrix} \Rightarrow \begin{bmatrix} -1.4231 \\ 1.8171 \end{bmatrix} \quad (13)$$

$$\begin{bmatrix} 1 \\ -1 \end{bmatrix} \Rightarrow \begin{bmatrix} -1.4412 \\ 1.8029 \end{bmatrix}$$

$$\begin{bmatrix} -1 \\ 1 \end{bmatrix} \Rightarrow \begin{bmatrix} 1.4412 \\ -1.8029 \end{bmatrix}$$

$$\begin{bmatrix} -1 \\ -1 \end{bmatrix} \Rightarrow \begin{bmatrix} 1.4231 \\ -1.8171 \end{bmatrix}$$

In the above exemplary calculation, it is found that the distance between the estimation vectors with respect to each of transmitted signal candidates (1, 1) and (1, −1) is small and that the distance between the estimation vectors with respect to each of transmitted signal candidates (−1, 1) and (−1, −1) is also small. That is, when a combination with extremely small distance between the estimation vectors exists, it is extremely difficult to find the maximum-likelihood vector.

The method of testing the condition of the first channel matrix utilizes the fact that the metrics for plural transmission patterns become close to one another when the beam-forming transmission is used as represented by Equations (12) and (13). In particular, several constellation patterns, such as BPSK and QPSK, are prepared for the testing and MLD is rehearsed using the channel matrix H. For example, distance χ between the metrics obtained using Equation (14) is calculated, assuming that two streams SA=(s0, s1)=(1, 1) and Sb (s0', s1')=(−1, 1) in the BPSK modulation system are transmitted.

$$\chi = \|H \cdot S_a - H \cdot S_b\|^2 \quad (14)$$

When the examples represented by the Equations (12) and (13) are applied, χ=5.2925e-004 which is an extremely small value. Since the χ includes noise or estimated error, the threshold has a margin for the noise or the estimated error. If the distance between the metrics is shorter than the threshold, the data are not solved in the linear area and it is therefore determined that the beam-forming transmission should be avoided.

In an examination of the condition of the second channel matrix, a distance of obtained metrics is calculated by performing MLD reception with respect to constellation points with simplified retrieval pattern. The number of the metrics located over certain distances is counted and a determination equation represented by Equation (15) is applied. It can be determined indirectly that if the value exceeds the threshold λ, the distance between the metrics is long enough to make a determination, which is not a condition in which the MLD is hardly solved not as in the examples represented by Equations (12) and (13).

$$(\|y - H \cdot x_k\|^2 - \delta^2 I) \geq \lambda^2 \quad (15)$$

In Equation (15), δ represents noise variance and I represents a unit matrix.

As represented by Equation (11), it can be determined that a beam-forming transmission signal based on SVD is received when the channel matrix H (i.e., UDVH) is a unitary matrix (e.g., UD) which obtains inappropriate power gain between the receiving antennae. As described above, a combination of the beam-forming transmission based on SVD and the MLD is not desirable (see FIGS. 5 to 7). When receiving beam-forming transmission signal based on the SVD, the receiver can switch itself to a receiving system according to a linear area equalization algorithm with a smaller circuit, such as a ZF and the MMSE, from the MLD reception system that has the best receiving property so as to reduce the power consumption.

On the basis of the channel matrix H of the beam-formed packet, the receiver takes the total electric power of the channel from the transmitting antenna, estimates an eigenvalue and normalizes the channel matrix H with the estimated eigenvalue. Then, whether the elements of each antenna of the normalized channel matrix H' are orthogonal to one another and determines that the channel matrix H is a unitary matrix if the calculation result is smaller than a predetermined threshold. For the purpose of simplicity, the determining procedure is described with reference to an antenna configuration of 2×2.

The channel matrix H of the packet subject to beam-forming transmission is represented by Equation (16).

$$H_{ij} = UD = \begin{bmatrix} h_{11} & h_{21} \\ h_{12} & h_{22} \end{bmatrix} = \begin{bmatrix} u_{11} & u_{21} \\ u_{12} & u_{22} \end{bmatrix} \begin{bmatrix} \lambda_1 & 0 \\ 0 & \lambda_2 \end{bmatrix} \quad (16)$$

$$0 < i \leq 2,$$

$$0 < j \leq 2$$

The element of the channel matrix is decomposed using Equation (16) and an eigenvalue is estimated in a manner represented by Equation (17).

$$\lambda'_1 = \|h_{11}\|^2 + \|h_{12}\|^2$$

$$\lambda'_2 = \|h_{21}\|^2 + \|h_{22}\|^2 \quad (17)$$

Using the result of Equation (17), as illustrated in Equation (18), the channel matrix H is normalized using the estimation diagonal matrix D'.

$$H'_{ij} = H/D' = \begin{bmatrix} h_{11} & h_{21} \\ h_{12} & h_{22} \end{bmatrix} / \begin{bmatrix} \lambda'_1 & 0 \\ 0 & \lambda'_2 \end{bmatrix} = \begin{bmatrix} h'_{11} & h'_{21} \\ h'_{12} & h'_{22} \end{bmatrix} \quad (18)$$

The normalized H' becomes a unitary matrix.

$$\beta = \|h'_{11} \times h'_{21}\|^2 - \|h'_{12} \times h'_{22}\|^2 \quad (19)$$

As a result of Equation (19), β is inevitably 0. In an actual process, since the matrix includes noise or estimated error of Equation (17), the threshold has a margin for the noise or the estimated error to determine whether the signal has been beam-formed.

The present application contains subject matter related to that disclosed in Japanese Priority Patent Application JP 2008-263961 filed in the Japan Patent Office on Oct. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system which includes a transmitter and a receiver each having two or more antennae, the system comprising:
    a channel condition determining unit which determines a condition of a channel between the transmitter and the receiver; and
    a system control unit which changes an antenna transmitting weight matrix that weights each antenna of a transmitting system in the transmitter and an antenna receiving weight matrix that weights each antenna of a receiving system in the receiver in accordance with a determination result obtained by the channel condition determining unit,
    wherein the channel condition determining unit calculates one of a determinant of a channel matrix and a rank of an eigenvalue estimated between the transmitter and the receiver to determine a number of streams to be used for communication and a modulating system to be used for communication,
    the system control unit adopts both a transmitting and a receiving system based on a linear area equalization algorithm when communication is established with the number of streams and modulating system within the determination result obtained by the channel condition determining unit, and the system control unit cancels adaptation of the transmitting system based on a linear area equalization algorithm and adopts a receiving system based on a non-linear area equalization algorithm when communication is established with the number of streams and modulating system outside of the determination result of the channel condition determining unit, and
    the receiver returns a response packet with NonValid Sounding when a link adaptation request is received from an M-antenna transmitter in which the number of the streams is specified.

2. The wireless communication system according to claim 1 wherein:
    the channel condition determining unit determines a rank number and SNR of the channel matrix between the transmitter and the receiver;
    the system control unit adopts a transmitting system based on a linear area equalization algorithm in the transmitter and a receiving system based on a linear area equalization algorithm in the receiver when the rank number of the channel matrix is high enough to allow two or more streams to pass through; and
    cancels adaptation of the transmitting system based on a linear area equalization algorithm in the transmitter and adopts a receiving system based on a non-linear area equalization algorithm when the rank number of the channel matrix is lowered to prevent transmission and reception of two or more streams each having a high SNR to avoid interference.

3. The wireless communication system according to claim 1, wherein, when M streams are to be transmitted with respect to M transmitting antennae, the system control unit cancels adaptation of the transmitting system based on a linear area equalization algorithm in the transmitter and adopts a receiving system based on a non-linear area equalization algorithm.

4. The wireless communication system according to claim 1 wherein, if a receiving system according to a non-linear area waveform equalization algorithm is adopted, the receiver returns a response packet with NonValid Sounding in response to a request to transmit a Sounding packet including a training sequence in order to excite the channel matrix from the transmitter.

5. The wireless communication system according to claim 1, wherein the channel condition determining unit determines whether or not the transmitter should adopt a transmitting system based on a linear area equalization algorithm according to an eigenvalue provided by a linear evaluation function according to an SNR of a channel between the transmitter and the receiver and an eigenvalue of the channel matrix, evaluation on the SNR alone, and an evaluation function for determining whether or not the condition of the channel is unsuitable for the non-linear area equalization algorithm.

6. The wireless communication system according to claim 5, wherein:
    the channel condition unsuitable for the non-linear area equalization algorithm is one in which the channel matrix H is a unitary matrix that obtains an inappropriate power gain between the receiving antennae; and
    the system control unit applies a receiving system based on a linear area equalization algorithm in the receiver in accordance with the determination result.

7. The wireless communication system according to claim 6, wherein the channel condition determining unit estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

8. The wireless communication system according to claim 1, wherein the channel condition determining unit has several constellation patterns for examination, calculates a metric distance in accordance with acquisition of the channel matrix H and, if the metric distance is smaller than a predetermined threshold, determines that the transmitter should not perform beam-forming.

9. The wireless communication system according to claim 1, wherein the channel condition determining unit has several constellation patterns for examination, calculates a metric distance to a receiving system based on a non-linear area equalization algorithm in accordance with acquisition of the channel matrix H and, if the metric distance is smaller than a predetermined threshold, determines that the transmitter should not perform beam-forming.

10. The wireless communication system according to claim 1, wherein, when the receiver is determined to be currently receiving a beam-forming transmission signal, the receiver adopts a receiving system based on a linear area equalization algorithm.

11. The wireless communication system according to claim 10, wherein the receiver determines that the receiver is currently receiving a beam-forming transmission signal when the channel matrix H is a unitary matrix which obtains an inappropriate power gain between the receiving antennae.

12. The wireless communication system according to claim 11, wherein the receiver estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

13. A wireless communication device comprising:
two or more antennae;
a channel condition determining unit which determines a condition of a channel with a communication partner;
a communication unit which transmits and receives a packet; and
a system control unit which switches antenna weighting matrices that weight each antenna in transmitting and receiving systems in the communication unit in accordance with a determination result obtained by the channel condition determining unit,
wherein the channel condition determining unit calculates one of a determinant of a channel matrix and a rank of an eigenvalue estimated between the wireless communication device and the communication partner to determine a number of streams that can be used for communication and a modulating system that can be used for communication; and
the system control unit adopts both a transmitting and a receiving system on a linear area equalization algorithm when communication is established with a number of streams and modulating system within the determination result of the channel condition determining unit, and the system control unit cancels adaptation of the transmitting system based on a linear area equalization algorithm and adopts a receiving system based on a non-linear area equalization algorithm when communication is established with the number of streams and modulating system outside of the determination result of the channel condition determining unit, and
the receiving system returns a response packet with Non-Valid Sounding when a link adaptation request is received from an M-antenna transmitter in which the number of the streams is specified.

14. The wireless communication device according to claim 13, wherein:
the channel condition determining unit determines a rank number and SNR of the channel matrix between the wireless communication device and the communication partner; and
the system control unit adopts one of a transmitting system and a receiving system based on a linear area equalization algorithm and a receiving system based on a linear area equalization algorithm when the rank number of the channel matrix is high enough to allow two or more streams to pass through and cancels adaptation of the transmitting system based on a linear area equalization algorithm and adopts a receiving system based on a non-linear area equalization algorithm when the rank number of the channel matrix is lowered to prevent transmission and reception of two or more streams each having a high SNR to avoid interference.

15. The wireless communication device according to claim 13, further comprising M transmitting antennae; wherein the system control unit cancels adaptation of the transmitting system based on a linear area equalization algorithm when M streams are to be transmitted.

16. The wireless communication device according to claim 13, wherein the system control unit adopts a receiving system based on a non-linear area equalization algorithm when a packet transmitted from M-antenna communication partner through M streams is to be received.

17. The wireless communication device according to claim 13, wherein the channel condition determining unit determines whether or not the communication partner should adopt a transmitting system based on a linear area equalization algorithm according to an eigenvalue of provided by a linear evaluation function according to an SNR of a channel between the wireless communication device and the communication partner and an eigenvalue of the channel matrix, evaluation on the SNR alone, and an evaluation function for examining whether or not the condition of the channel is unsuitable for the non-linear area equalization algorithm.

18. The wireless communication device according to claim 17, wherein the condition of the channel is determined to be unsuitable for the non-linear area equalization algorithm if the channel matrix H is a unitary matrix that obtains an inappropriate power gain between the receiving antennae; and the system control unit applies a receiving system based on a linear area equalization algorithm in accordance with the determination result.

19. The wireless communication device according to claim 18, wherein the channel condition determining unit estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

20. The wireless communication device according to claim 13, wherein the channel condition determining unit has several constellation patterns for examination, calculates a metric distance in accordance with acquisition of the channel matrix H and, if the metric distance is smaller than a predetermined threshold, determines that the communication partner should not perform beam-forming.

21. The wireless communication device according to claim 13, wherein the channel condition determining unit has several constellation patterns for examination, calculates a metric distance to a receiving system based on a non-linear area equalization algorithm in accordance with acquisition of the channel matrix H and, if the metric distance is smaller than a predetermined threshold, determines that the communication partner should not perform beam-forming.

22. The wireless communication device according to claim 13, wherein the system control unit applies a receiving system based on a linear area equalization algorithm if it is determined that the channel condition determining unit is receiving a beam-forming transmission signal.

23. The wireless communication device according to claim 22, wherein it can be determined that a beam-forming transmission signal is received when the channel matrix H is a unitary matrix which obtains inappropriate power gain between the receiving antennae.

24. The wireless communication device according to claim 23, wherein the channel condition determining unit estimates an eigenvalue on the basis of a channel matrix H of a beam-formed packet from the total electric power of the channel from the transmitting antenna, normalizes the channel matrix H with the estimated eigenvalue, calculates whether the elements of each antenna of the normalized channel matrix H' are orthogonal to one another and determines that the channel matrix H is a unitary matrix if the calculation result is smaller than a predetermined threshold.

25. A wireless communication method using two or more antennae, the method comprising:
- determining a condition of a channel with a communication partner;
- performing a communication by transmitting and receiving a packet; and
- performing system control by switching antenna weighting matrices that weight each antenna in transmitting and receiving systems in accordance with a determination result obtained by a channel condition determining unit,
- wherein a determinant of a channel matrix and a rank of an eigenvalue estimated relative to the communication partner to determine a number of streams that can be used for communication and a modulating system that can be used for communication; and
- both a transmitting system and a receiving system are adopted based on a linear area equalization algorithm when communication is established with a number of streams and modulating system within the determination result of the channel condition determining unit, and
- adaptation of the transmitting system based on a linear area equalization algorithm is canceled and a receiving system based on a non-linear area equalization algorithm is adopted when communication is established with the number of streams and modulating system outside of the determination result of the channel condition determining unit, and
- the receiving system returns a response packet with Non-Valid Sounding when a link adaptation request is received from an M-antenna transmitter in which the number of the streams is specified.

26. A non-transitory computer-readable medium storing computer-readable instructions thereon, the computer-readable instructions when executed by a computer cause the computer to perform a wireless communication method using two or more antennae on the computer, comprising:
- determining a condition of a channel with a communication partner;
- transmitting and receiving a packet; and
- switching between antenna weighting matrices that weight each antenna in transmitting and receiving systems in the communication unit in accordance with a determination result obtained by the channel condition determining unit,
- wherein a determinant of a channel matrix and a rank of an eigenvalue estimated relative to the communication partner to determine a number of streams that can be used for communication and a modulating system that can be used for communication; and
- both a transmitting system and a receiving system is adopted based on a linear area equalization algorithm when communication is established with a number of streams and modulating system within the determination result of the channel condition determining unit, and
- adaptation of the transmitting system based on a linear area equalization algorithm is canceled and a receiving system based on a non-linear area equalization algorithm is adopted when communication is established with the number of streams and modulating system outside of the determination result of the channel condition determining unit, and
- the receiving system returns a response packet with Non-Valid Sounding when a link adaptation request is received from an M-antenna transmitter in which the number of the streams is specified.

* * * * *